US008995564B2

(12) United States Patent
Liu et al.

(10) Patent No.: US 8,995,564 B2
(45) Date of Patent: *Mar. 31, 2015

(54) TRANSMISSION PROTECTION FOR WIRELESS COMMUNICATIONS

(71) Applicant: Marvell World Trade Ltd., St. Michael (BB)

(72) Inventors: Yong Liu, Campbell, CA (US); Raja Banerjea, Sunnyvale, CA (US); Harish Ramamurthy, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/022,064

(22) Filed: Sep. 9, 2013

(65) Prior Publication Data
US 2014/0010145 A1 Jan. 9, 2014

Related U.S. Application Data

(63) Continuation of application No. 13/025,081, filed on Feb. 10, 2011, now Pat. No. 8,532,221.

(60) Provisional application No. 61/415,778, filed on Nov. 19, 2010, provisional application No. 61/412,361, (Continued)

(51) Int. Cl.
H04L 27/00 (2006.01)
H04W 74/08 (2009.01)
H04L 5/00 (2006.01)

(52) U.S. Cl.
CPC ......... H04W 74/0816 (2013.01); H04L 5/0023 (2013.01); H04L 5/0044 (2013.01)
USPC ........................................ 375/295

(58) Field of Classification Search
CPC H04L 5/0044; H04L 5/0023; H04W 74/0816
USPC ........................................ 375/295
See application file for complete search history.

(56) References Cited

U.S. PATENT DOCUMENTS 7,352,718 B1 4/2008 Perahia et al.
8,270,909 B2 9/2012 Zhang et al.
(Continued)

FOREIGN PATENT DOCUMENTS

JP 2007081625 A 3/2007
WO 2007117949 10/2007
(Continued)

OTHER PUBLICATIONS

"DRAFT Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band," IEEE Std. 802.11g (2003), 69 pages.
(Continued)

Primary Examiner — Daniel Washburn
Assistant Examiner — Barhanu Tadese

(57) ABSTRACT

Systems and techniques for wireless communication are described. A described technique includes performing, at a first device, a sequence with multiple second devices to protect a wireless communication neighborhood of the first device and wireless communication neighborhoods of the second devices for a transmission of a multi-user frame, the multi-user frame including spatially steered data frames that are respectively intended for the second devices; determining bandwidth availabilities for the second devices based on information received from the second devices during the sequence; selecting a bandwidth configuration for the multi-user frame based on the bandwidth availabilities to produce a selected bandwidth configuration that enables the data frames to be spatially steered and transmitted concurrently within the multi-user frame based on a common bandwidth availability among the second devices; and generating and transmitting the multi-user frame to the second devices in accordance with the selected bandwidth configuration.

24 Claims, 11 Drawing Sheets

Related U.S. Application Data filed on Nov. 10, 2010, provisional application No. 61/407,259, filed on Oct. 27, 2010, provisional application No. 61/405,555, filed on Oct. 21, 2010, provisional application No. 61/377,395, filed on Aug. 26, 2010, provisional application No. 61/305,495, filed on Feb. 17, 2010, provisional application No. 61/303,817, filed on Feb. 12, 2010, provisional application No. 61/303,223, filed on Feb. 10, 2010.

(56) References Cited

U.S. PATENT DOCUMENTS

| | | | |
|---|---|---|---|
| 8,379,757 | B1 | 2/2013 | Zhang et al. |
| 8,532,221 | B2 * | 9/2013 | Liu et al. ................. 375/295 |
| 8,705,340 | B2 * | 4/2014 | Gong et al. .............. 370/216 |
| 2003/0133469 | A1 | 7/2003 | Brockmann et al. |
| 2005/0147023 | A1 | 7/2005 | Stephens et al. |
| 2006/0114867 | A1 | 6/2006 | Du et al. |
| 2007/0133447 | A1 * | 6/2007 | Wentink ................... 370/310 |
| 2007/0147322 | A1 * | 6/2007 | Agrawal et al. .......... 370/338 |
| 2008/0080553 | A1 * | 4/2008 | Hasty et al. .............. 370/468 |
| 2008/0112351 | A1 * | 5/2008 | Surineni et al. .......... 370/312 |
| 2008/0144586 | A1 | 6/2008 | Kneckt et al. |
| 2008/0227488 | A1 * | 9/2008 | Zhu et al. ............... 455/553.1 |
| 2008/0311852 | A1 * | 12/2008 | Hansen et al. ........... 455/41.2 |
| 2009/0138603 | A1 | 5/2009 | Surineni et al. .......... 709/227 |
| 2010/0008318 | A1 * | 1/2010 | Wentink et al. .......... 370/329 |
| 2010/0014502 | A1 * | 1/2010 | Singh et al. .............. 370/343 |
| 2010/0080173 | A1 * | 4/2010 | Takagi ..................... 370/328 |
| 2010/0260138 | A1 | 10/2010 | Liu et al. |
| 2011/0038332 | A1 | 2/2011 | Liu et al. |
| 2011/0051647 | A1 * | 3/2011 | Sampath et al. ......... 370/312 |
| 2011/0149723 | A1 * | 6/2011 | Gong et al. .............. 370/216 |
| 2011/0150004 | A1 | 6/2011 | Denteneer et al. |
| 2012/0051342 | A1 | 3/2012 | Liu et al. |
| 2012/0207243 | A1 * | 8/2012 | Koivisto et al. .......... 375/296 |
| 2012/0236840 | A1 | 9/2012 | Kim et al. |
| 2012/0257612 | A1 | 10/2012 | Seok |

FOREIGN PATENT DOCUMENTS

| | | | |
|---|---|---|---|
| WO | WO2009027931 A3 | 4/2009 | |
| WO | WO2009050656 A1 | 4/2009 | |

OTHER PUBLICATIONS

"Information technology—Telecommunications and information exchange between systems—Local and metropolitan networks—specific requirements. Part 11: Wireless LAN Medium Access Control (MAC) and Physical Layer (PHY) Specifications", IEEE Std. 802.11n, Oct. 29, 2009, 535 pages.

"Part 11: Wireless LAN Medium Access Control (MAC) and Physical Layer (PHY) specifications: Higher-Speed Physical Layer Extension in the 2.4 GHz Band", IEEE Std 802.11a, 1999, 91 pages.

"Part II: Wireless LAN Medium Access Control (MAC) and Physical Layer (PHY) specifications: Higher-Speed Physical Layer Extension in the 2.4 GHz Band," IEEE Std. 802.11b (1999), 96 pages.

Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks, IEEE Std 802.3ac-1998, 19 pages.

"TGn Sync Proposal Technical Specification," IEEE Std. 802.11n (2005), 131 pages.

Cariou et al., "Multi-Channel Transmissions," 802.11 TGac, IEEE, 802.11-09/1022r0, Sep. 21, 2009, 13 pages.

Garcia, Larrode, M., Authorized Officer, European Patent Office, PCT International Application No. PCT/US2010/044457, in International Search Report, mailed Nov. 10, 2010, 16 pages.

Kim, Dae Sung, Authorized Officer, Korean Intellectual Property Office, PCT International Application No. PCT/US2011/024396, international filing date of Feb. 10, 2011, in International Search Report, mailed Sep. 27, 2011, 9 pages.

Liu et al., "Methods and Apparatus for Determining a Composite Channel," U.S. Appl. No. 13/034,409, filed Feb. 24, 2011, to be published by the USPTO, 64 pages.

Rosken, Wilfriend, Authorized Officer, European Patent Office, PCT International Application No. PCT/US2010/056619, in International Search Report mailed Mar. 2, 2011, 10 pages.

Singh et al., "Enhanced Power Saving in Next Generation Wireless LANs", Sep. 2006, 2006 IEEE 64th Vehicular Technology Conference, Montreal, Canada, 5 pages.

Zhang et al., "Exploiting Multi-Antennas for Opportunistic Spectrum Sharing in Cognitive Radio Networks," IEEE the 18th Annual IEEE International Symposium on Personal, Indoor and Mobile Radio Communications (PIMRC), 2007, 5 pages.

Japanese Patent Application No. 2012-553005, Notice of Reasons for Rejection, Sep. 16, 2014, 4 pages.

* cited by examiner

TRANSMISSION PROTECTION FOR WIRELESS COMMUNICATIONS

CROSS REFERENCE TO RELATED APPLICATIONS

This patent disclosure is a continuation of and claims the benefit of the priority of U.S. patent application Ser. No. 13/025,081, filed Feb. 10, 2011 and entitled "Transmission Protection for Wireless Communications" (now U.S. Pat. No. 8,532,221), which claims the benefit of the priority of U.S. Provisional Application Ser. No. 61/415,778, filed Nov. 19, 2010 and entitled "VHT Wide BW Indication"; the benefit of the priority of U.S. Provisional Application Ser. No. 61/412,361, filed Nov. 10, 2010 and entitled "VHT Wide BW Indication"; U.S. Provisional Application Ser. No. 61/407,259, filed Oct. 27, 2010 and entitled "VHT MU TXOP Support"; the benefit of the priority of U.S. Provisional Application Ser. No. 61/405,555, filed Oct. 21, 2010 and entitled "VHT SDMA TX Sequence Support"; the benefit of the priority of U.S. Provisional Application Ser. No. 61/377,395, filed Aug. 26, 2010 and entitled "VHT SDMA TX Sequence Support"; the benefit of the priority of U.S. Provisional Application Ser. No. 61/305,495, filed Feb. 17, 2010 and entitled "VHT Transmission Sequence Protection"; the benefit of the priority of U.S. Provisional Application Ser. No. 61/303,817, filed Feb. 12, 2010 and entitled "VHT Transmission Sequence Protection"; and the benefit of the priority of U.S. Provisional Application Ser. No. 61/303,223, filed Feb. 10, 2010 and entitled "VHT Transmission Sequence Protection." This disclosure is related to U.S. patent application Ser. No. 12/850,529, filed Aug. 4, 2010, and entitled "SDMA MULTI-DEVICE WIRELESS COMMUNICATIONS." All of the above second applications are incorporated herein by reference in their entirety.

BACKGROUND

This disclosure relates to wireless communication systems, such as Wireless Local Area Networks (WLANs).

Wireless communication systems can include multiple wireless communication devices that communicate over one or more wireless channels. When operating in an infrastructure mode, a wireless communication device called an access point (AP) provides connectivity with a network, such as the Internet, to other wireless communication devices, e.g., client stations or access terminals (AT). Various examples of wireless communication devices include mobile phones, smart phones, wireless routers, and wireless hubs. In some cases, wireless communication electronics are integrated with data processing equipment such as laptops, personal digital assistants, and computers.

Wireless communication systems, such as WLANs, can use one or more wireless communication technologies, such as orthogonal frequency division multiplexing (OFDM). In an OFDM based wireless communication system, a data stream is split into multiple data substreams. Such data substreams are sent over different OFDM subcarriers, which can be referred to as tones or frequency tones. WLANs such as those defined in the Institute of Electrical and Electronics Engineers (IEEE) wireless communications standards, e.g., IEEE 802.11a, IEEE 802.11n, or IEEE 802.11ac, can use OFDM to transmit and receive signals.

Some wireless communication systems use a single-in-single-out (SISO) communication approach, where each wireless communication device uses a single antenna. Other wireless communication systems use a multiple-in-multiple-out (MIMO) communication approach, where a wireless communication device, for example, uses multiple transmit antennas and multiple receive antennas. A MIMO-based wireless communication device can transmit and receive multiple spatial streams over multiple antennas in each of the tones of an OFDM signal.

Wireless communication devices in a WLAN can use one or more protocols for medium access control (MAC). For example, a wireless communication device can use Enhanced Distributed Channel Access (EDCA) for contention based medium access control. In another example, a device can use a hybrid coordination function (HCF) to implement HCF controlled channel access (HCCA) for contention-free access to a wireless medium. A HCF can provide EDCA for access during a contention period and HCCA for access during a contention-free period.

SUMMARY

The present disclosure includes systems and techniques for wireless communications.

According to an aspect of the present disclosure, a technique for wireless communications includes identifying devices to receive spatially steered data frames during a transmission opportunity (TXOP), the data frames being included in a multi-user frame; transmitting, during the TXOP, request to send (RTS) information to the identified devices; receiving clear to send (CTS) responses from the identified devices; determining a bandwidth configuration for the multi-user frame based on the CTS responses, and transmitting, during the TXOP, the multi-user frame to the identified devices in accordance with the bandwidth configuration. The bandwidth configuration can indicate one or more frequency bands that are available during at least a portion of the TXOP.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Systems and devices can include circuitry to access a wireless communication interface and processor electronics configured to identify devices to receive spatially steered data frames during a TXOP, the data frames being included in a multi-user frame, transmit, during the TOP, RTS information to the identified devices, receive CTS responses from the identified devices, determine a bandwidth configuration for the multi-user frame based on the CTS responses, the bandwidth configuration indicating one or more frequency bands that are available during at least a portion of the TXOP, and control, during the TXOP, a transmission of the multi-user frame via the wireless communication interface to the identified devices in accordance with the bandwidth configuration. Systems and devices can include circuitry to transmit, during the TXOP, the multi-user frame to the identified devices in accordance with the bandwidth configuration.

In some implementations, the processor electronics are configured to transmit a first RTS frame to a first device of the identified devices, the RTS information including the first RTS frame, receive a first CTS frame in response to the first RTS frame, the CTS responses including the first CTS frame, transmit, responsive to receiving the first CTS frame, a second RTS frame to a second device of the identified devices, the RTS information including the second RTS frame, and receive a second CTS frame in response to the second RTS frame, the CTS responses including the second CTS frame.

In some implementations, a first bandwidth configuration indicated by the first CTS frame is equal to or less than a bandwidth configuration indicated by the first RTS frame, the first bandwidth configuration being based on an available bandwidth at the first device. In some implementations, a second bandwidth configuration indicated by the second CTS frame is equal to or less than a bandwidth configuration indicated by the second RTS frame, the second bandwidth configuration being based on an available bandwidth at the second device. In some implementations, the processor electronics are configured to determine the bandwidth configuration for the multi-user frame based on selecting a smallest bandwidth configuration indicated by the CTS responses. In some implementations, the processor electronics are configured to select the bandwidth configuration indicated by the second RTS frame to be less than or equal to the bandwidth configuration indicated by the first CTS frame.

In some implementations, transmitting the second RTS frame is responsive to an expiration of a timer. The timer can be configured based on receiving the first CTS frame and an interframe space (IFS) parameter. The second device can be configured to determine an availability of two or more channels during a duration of the timer. In some implementations, transmitting the second RTS frame is responsive to an expiration of a timer. The timer can be configured based on receiving the first CTS frame and a short interframe space (SIFS) parameter. The second CTS frame indicates the same bandwidth configuration as indicated by the second RTS frame.

In some implementations, a multi-user frame includes data belonging to a primary access category and data belonging to a secondary access category. In some implementations, the processor electronics are configured to identify a primary device of the devices that will receive data belonging to the primary access category, and transmitting the RTS information includes transmitting an initial RTS frame to the primary device. Transmitting the RTS information can include transmitting a mufti-user RTS (MU-RTS) frame to cause the identified devices to transmit the CTS responses. Receiving the CTS responses can include receiving, during a response period associated with the MU-RTS frame, CTS frames via respective spatial wireless communication channels. The CTS responses can include an indication of one or more valid frequency bands available for transmission, the one or more frequency bands providing an aggregate bandwidth of 20 MHz, 40 MHz, 80 MHz, or 160 MHz.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

This disclosure provides details and examples of technologies for wireless local area networks, including, among other things, systems and techniques for securing a wireless medium to protect multi-user wireless communications. Potential advantages of one or more of the described technologies can include increased protection of a transmission opportunity from unrelated devices transmitting during the transmission opportunity, increased utilization of multi-channel capacity during a transmission opportunity, the capability of sending data belonging to two or more access categories having different transmission priorities in the same transmission opportunity, or a combination thereof. The techniques and architectures presented herein can be implemented in a variety of wireless communication systems, such as ones based on IEEE 802.11n or IEEE 802.11ac. One of more of the described systems and techniques can be combined with technology disclosed by U.S. patent application Ser. No. 12/850,529, filed Aug. 4, 2010, and entitled "SDMA MULTI-DEVICE WIRELESS COMMUNICATIONS."

Figure 1:
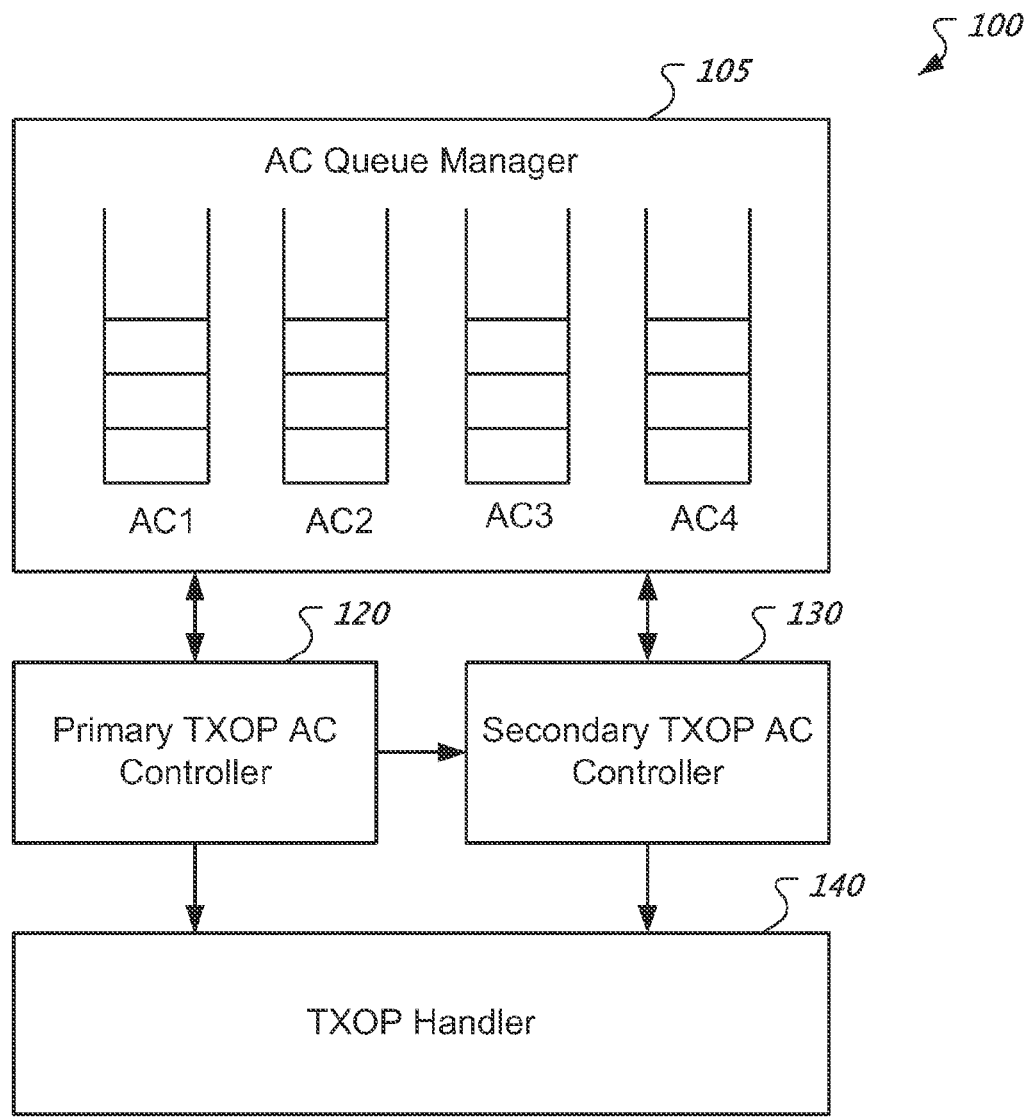
FIG. 1 shows an example of a wireless medium access control architecture that includes a controller for a primary access category of a transmission opportunity and a controller for a secondary access category of the transmission opportunity.

FIG. 1 shows an example of a wireless medium access control architecture that includes a controller for a primary access category of a transmission opportunity and a controller for a secondary access category of the transmission opportunity. A wireless communication device 100 transmits data during a transmission opportunity (TXOP) based on one or more wireless communication protocols. A medium access control (MAC) architecture of the wireless communication device 100 includes an access category (AC) queue manager 105, primary access category controller 120, secondary access category controller 130, and a TXOP handler 140. The device 100 can include additional secondary access category controllers (not shown). In some implementations, the primary access category controller 120 includes the secondary access category controller 130. In some implementations, the queue manager 105 includes the primary access category controller 120 and the secondary access category controller 130.

The access category queue manager 105 manages multiple access category queues (e.g., AC1, AC2, AC3, and AC4). Various examples of access categories include an access category for best-effort traffic, an access category for voice traffic, an access category for video traffic, and an access category for background traffic. An access category can be associated with one or more transmission parameters such as an Arbitration Inter Frame Spacing (AIFS) value, a minimum contention window value (CWmin), and a maximum contention window value (CWmax). Different transmission priorities can be realized based on different values for one or more of the transmission parameters. In some implementations, the access category queue manager 105 manages two or more access category queues for the same type of traffic (e.g., voice, video, best-effort, background), but are associated with different traffic identifiers (TIDs). For example, a voice access category having a TID of 5 can have a higher transmission priority than a voice access category having a TID of 4. The device 100 can provide multiple levels of Quality-of-Service (QoS) based on traffic identifiers, access categories, or both. In some implementations, an access category queue can be partitioned into two or more queues that store data elements for separate recipient devices.

The primary controller 120 can determine a primary access category for a TXOP based on back-off durations associated with respective access category queues. In some implementations, the primary controller 120 determines a primary access category for a TXOP based on the expiration of a back-off timer and the wireless medium being idle. In some implementations, an expiration of a back-off timer can be set based on one or more transmission parameters (e.g., an AIFS value, CWmin value, CWmax value, or a combination thereof) and a random value. In some cases, a back-off timer associated with an access category queue is started in response to inserting one or more data elements into an empty access category queue. In some implementations, the primary controller 120 performs an internal collision resolution to select an access category for a TXOP.

The secondary controller 130 can determine one or more secondary access categories for the TXOP. Determining one or more secondary access categories can include querying the access category queue manager 105 to retrieve a list of non-empty access category queues. Based on the list, the secondary controller 130 can select an access category queue. The secondary controller 130 can receive an indication from the primary controller 120 regarding the identity of the primary access category. The secondary controller 130 can select a secondary access category that is different from the primary access category. In some cases, the secondary access category has a higher transmission priority than the primary access category. In some other cases, the secondary access category has a tower transmission priority than the primary access category.

Based on determining a primary access category for the TXOP, the primary TXOP access category controller 120 can retrieve one or more data elements belonging to an access category deemed the primary access category for the TXOP. The secondary TXOP access category controller 130 can retrieve one or more data elements belonging to an access category deemed a secondary access category for the TXOP. The retrieved data elements can be provided to the TXOP handler 140. Various examples of data elements include a data unit, a portion of a data unit, or a string of one or more bits. Other types of data elements are possible. A data unit can be based on an aggregate data unit format that specifies signaling for aggregating multiple medium access control (MAC) data units (e.g., MAC protocol data units (MPDUs)) into aggregate data unit e.g., aggregated MPDU (A-MPDU)).

For a Space Division Multiple Access (SDMA) transmission during the TXOP, the TXOP handler 140 can provide to a physical (PHY) layer module (not shown) data streams that are intended for separate wireless device recipients via respective spatially steered streams. The handler 140 receives primary data from the primary controller 120 and secondary data from the secondary controller 130. Based on the primary and secondary data, the handler 140 can arrange the data into one or more multi-user (MU) frames. A MU frame can include two or more data frames for respective wireless devices. A data frame can include one or more data units, or at least a portion of a data unit. The length of the TXOP can be determined by the primary access category traffic.

In some implementations, the primary TXOP access category controller 120 selects a first recipient device having primary access category data for a first multi-user transmission in a TXOP. The TXOP handler 140 can include a multi-user controller. Based on available spatial resources, a multi-user contra can select a multi-user group including the selected first recipient device. Based on data information for all multi-user recipients associated with the TXOP, the multi-user controller can determine, for a subsequent multi-user transmission(s), whether the (primary access category or a secondary access category is selected for each recipient device.

A wireless communication device 100 can include circuitry to access a wireless communication interface and processor electronics configured to perform one or more techniques described herein. For example, processor electronics can be configured to implement the functionality of an access category (AC) queue manager 105, primary access category controller 120, secondary access category controller 130, and a TXOP handler 140. A wireless communication interface can include circuitry to transmit and receive wireless communication signals. In some implementations, a communication process running on the device 100 sends a signal(s) indicative of two or more streams to a wireless communication interface, which converts the digital signal(s) into an analog signal(s). Transmitting the streams can include transmitting signals that concurrently provide separate data to two or more devices.

Figure 2:
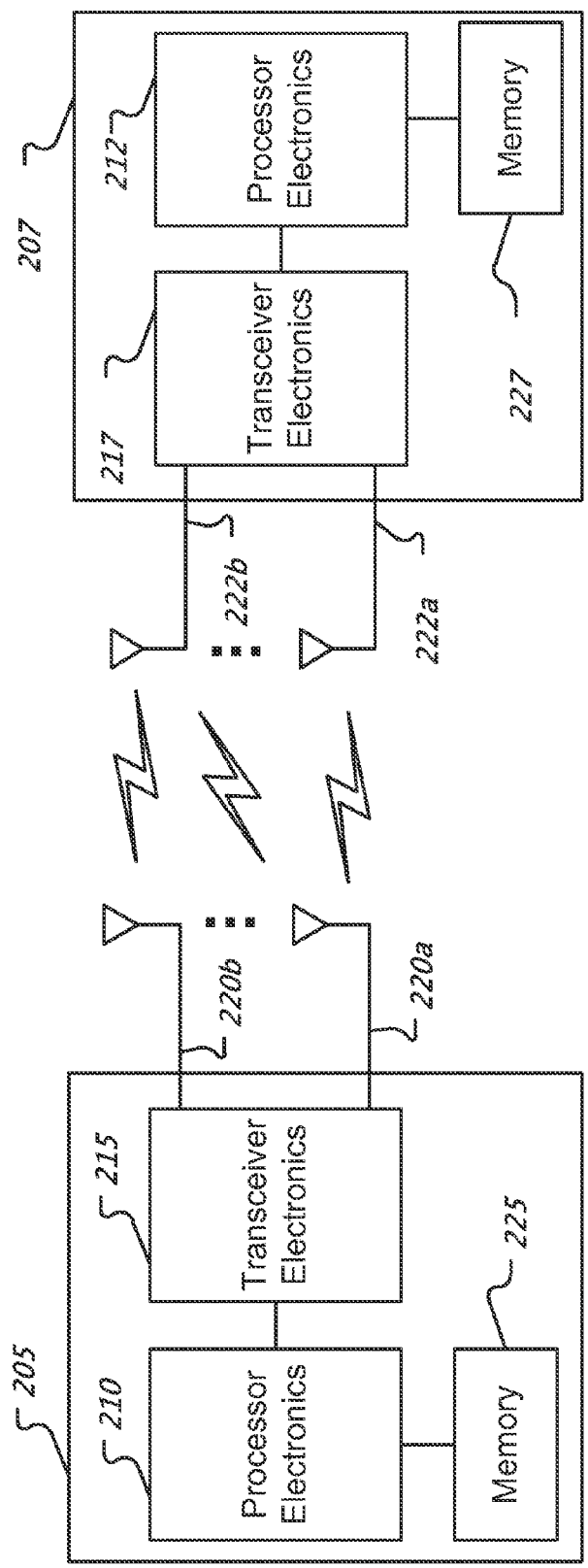
FIG. 2 shows an example of a wireless network with two wireless communication devices.

FIG. 2 shows an example of a wireless network with two wireless communication devices. Wireless communication devices 205, 207 such as an access point (AP), base station (BS), wireless headset, access terminal (AT), client station, or mobile station (MS) can include circuitry such as processor electronics 210, 212. Processor electronics 210, 212 can include one or more processors that implement one or more techniques presented in this disclosure. Wireless communication devices 205, 207 include circuitry such as transceiver electronics 215, 217 to send and receive wireless signals over one or more antennas 220a, 220b, 222a, 222b. Wireless communication devices 205, 207 can communicate with one or more types of devices (e.g., devices based on different wireless communication standards) such as a high-throughput (HT) device (e.g., IEEE 802.11n based device) or a very high-throughput (VEIT) device (e.g., IEEE 802.11ac based device).

In some implementations, transceiver electronics 215, 217 include integrated transmitting and receiving circuitry. In some implementations, transceiver electronics 215, 217 include multiple radio units. In some implementations, a radio unit includes a baseband unit (BBU) and a radio frequency unit (RFU) to transmit and receive signals. Transceiver electronics 215, 217 can include one or more of: detector, decoder, modulator, and encoder. Transceiver electronics 215, 217 can include one or more analog circuits. Wireless communication devices 205, 207 include one or more memories 225, 227 configured to store information such as data, instructions, or both. In some implementations, wireless communication devices 205, 207 include dedicated circuitry for transmitting and dedicated circuitry for receiving. In some implementations, a wireless communication device 205, 207 is operable to act as a serving device (e.g., an access point), or a client device.

A first wireless communication device 205 can transmit data to one or more devices via two or more spatial wireless communication channels such as orthogonal spatial subspaces, orthogonal SDMA subspaces. For example, the first wireless communication device 205 can concurrently transmit data to a second wireless communication device 207 using a spatial wireless channel and can transmit data to a third wireless communication device (not shown) using a different spatial wireless channel. In some implementations, the first wireless communication device 205 implements a space division technique to transmit data to two or more wireless communication devices using two or more spatial multiplexing matrices to provide spatially separated wireless channels in a single frequency range.

Wireless communication devices, such as a MIMO enabled access point, can transmit signals for multiple client wireless communication devices at the same time in the same frequency range by applying one or more transmitter side beam forming matrices to spatially separate signals associated with different client wireless communication devices. Based on different signal patterns at the different antennas of the wireless communication devices, each client wireless communication device can discern its own signal. A MIMO enabled access point can participate in sounding to obtain channel state information for each of the client wireless communication devices. The access point can compute spatial multiplexing matrices, such as spatial steering matrices, based on the different channel state information to spatially separate signals to different client devices.

Figure 3:
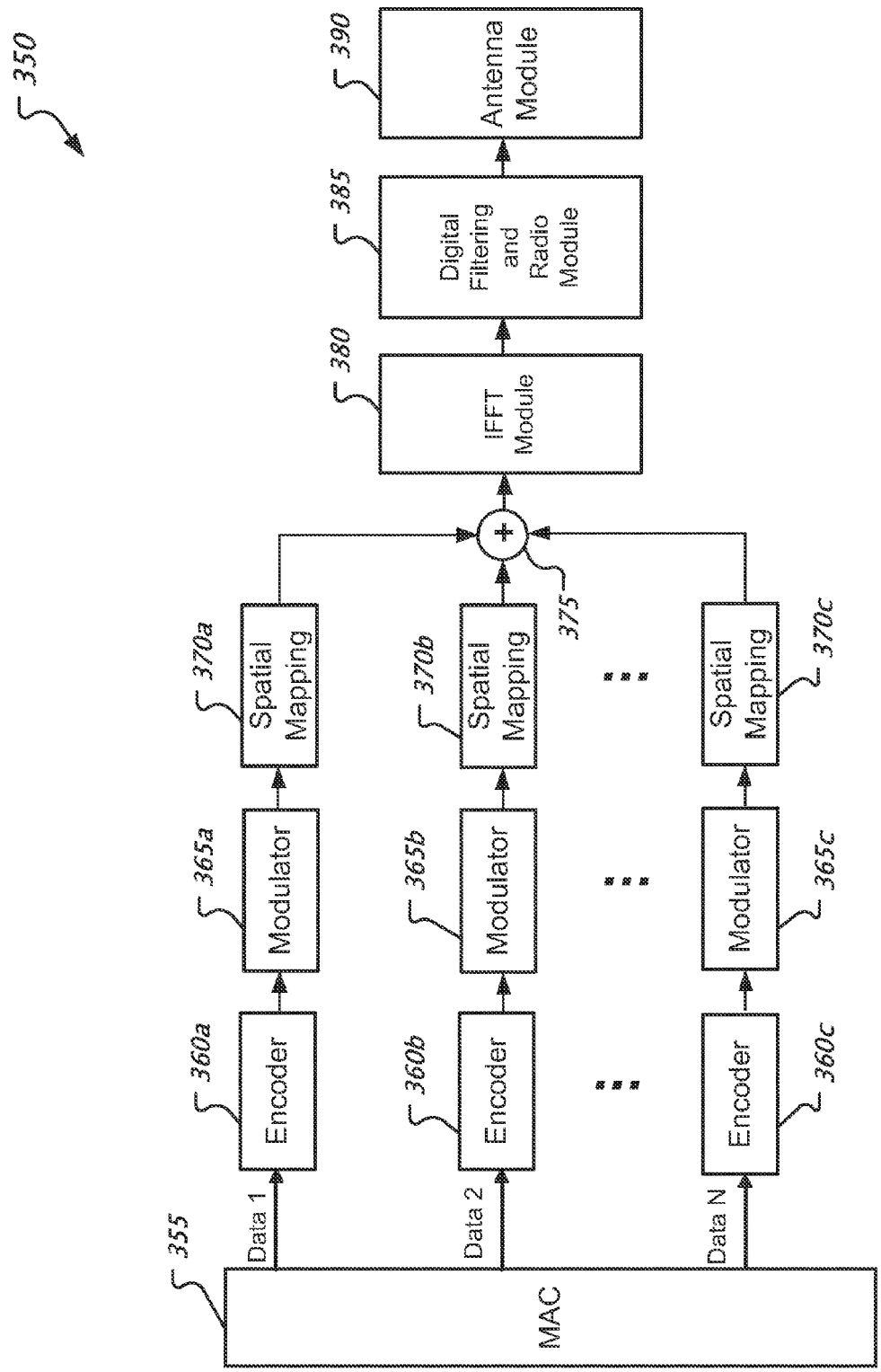
FIG. 3 shows an example of a wireless communication device architecture.

FIG. 3 shows an example of a wireless communication device architecture, which can include the various implementation details described herein. A wireless communication device 350 can produce signals for different clients that are spatially separated by respective spatial multiplexing matrices $W_i$, e.g., steering matrices. Each $W_i$ is associated with a subspace. The wireless communication device 350 includes a MAC module 355. The MAC module 355 can include one or more MAC control units (MCUs) (not shown). The MAC module 355 can include components that are depicted by the MAC architecture of FIG. 1.

The wireless communication device 350 includes three or more encoders 360a, 360b, 360c that receive data streams, from the MAC module 355, for N respective client devices. The encoders 360a-c can perform encoding, such as a forward error correction (FEC) encoding technique to produce respective encoded streams. Modulators 365a, 365b, 365c can perform modulation on respective encoded streams to produce modulated streams provided to spatial mapping modules 370a, 370b, 370c.

The spatial mapping modules 370a-c can access a memory (not shown) to retrieve a spatial multiplexing matrix $W_i$ associated with a data streams intended client device. In some implementations, the spatial mapping modules 370a-c access the same memory, but at different offsets to retrieve different matrices. An adder 375 can sum spatially steered outputs from the spatial mapping modules 370a-c.

An Inverse Fast Fourier Transform (IFFT) module 380 can perform an IFFT or an output of the adder 375 to produce a time domain signal. A digital filtering and radio module 385 can filter the time domain signal and amplify the signal for transmission via an antenna module 390. An antenna module 390 can include multiple transmit antennas and multiple receive antennas. In some implementations, an antenna module 390 is a detachable unit that is external to a wireless communication device 350.

In some implementations, a wireless communication device 350 includes one or more integrated circuits (ICs). In some implementations, a MAC module 355 includes one or more ICs. In some implementations, a wireless communication device 350 includes an IC that implements the functionality of multiple units and/or modules such as a MAC module, MCU, BBU, or RFU. In some implementations, a wireless communication device 350 includes a host processor that provides a data stream to a MAC module 355 for transmission. In some implementations, a wireless communication device 350 includes a host processor that receives a data stream from the MAC module 355. In some implementations, a host processor includes a MAC module 355.

A MAC module 355 can generate a MAC Service Data Unit (MSDU) based on data received from higher level protocols such a Transmission Control Protocol over Internet Protocol (TCP/IP). A MAC module 355 can generate a MAC Protocol Data Unit (MPDU) based on a MSDU. In some implementations, a MAC module 355 can generate a Physical Layer Service Data Unit (PSDU) based on a MPDU. For example, a wireless communication device can generate a data unit (e.g., a MPDU or a PSDU) that is intended for a single wireless communication device recipient. A Physical Layer Protocol Data Unit (PPDU) can encapsulate a PSDU.

A wireless communication device 350 can perform omnidirectional transmissions that are intended for multiple client devices. For example, the MAC module 355 can operate a single data pathway between the MAC module 355 and the IFFT module 380 to cause an omni-directional transmission. The device 350 can perform steered transmissions that concurrently provide separate data to multiple client devices. The device 350 can alternate between omni-directional transmissions and steered transmissions. In steered transmissions, the device 350 can transmit a first PPDU to a first client via a first spatial wireless channel and concurrently transmit a second PPDU to a second client via a second spatial wireless channel.

Figure 4:
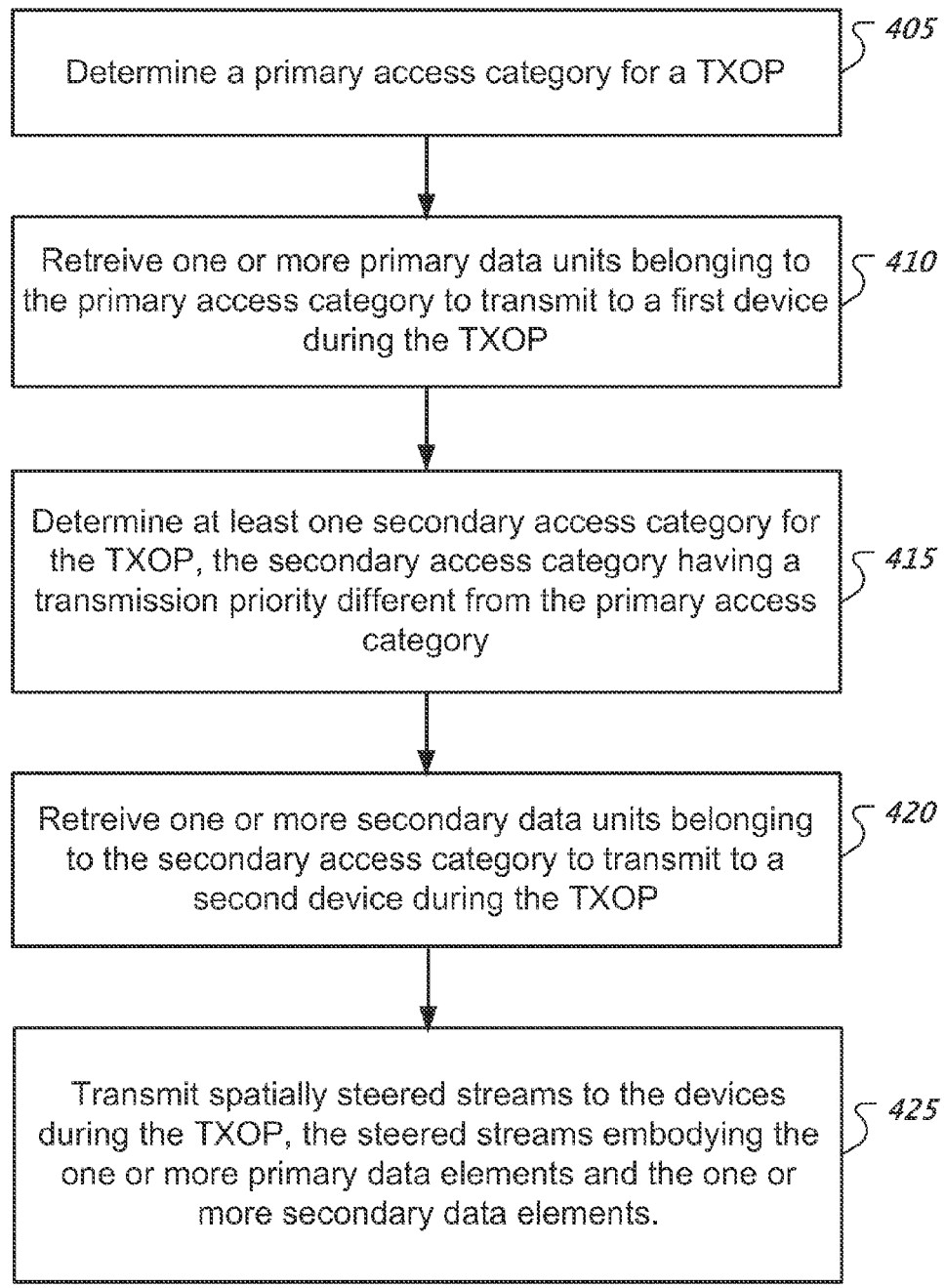
FIG. 4 shows an example of a communication process that includes determining multiple access categories for a transmission opportunity.

FIG. 4 shows an example of a communication process that includes determining multiple access categories for a TXOP. A communication process can be implemented by a device such an access point device or a client device. At 405, the communication process determines a primary access category for a TXOP. For example, the primary access category can be an access category included in a group of access categories that are associated with different transmission priorities, respectively. The communication process can include determining a (primary device for the TXOP.

In some implementations, the process to obtain a TXOP is based on Enhanced. Distributed Channel Access (EDCA).

Determining the primary access category can include determining the TXOP based on a back-off timer associated with the primary access category. The process can run multiple EDCA functions (EDCAF) that correspond to respective access categories. In some implementations, an EDCAF that wins internal collision decides the primary access category of an EDCA based TXOP. In some other implementations, the communication process uses a hybrid coordination function (HCF) to control access to wireless communication resources, and the TXOP is based on HCF controlled channel access (HCCA).

At 410, the communication process retrieves one or more primary data units belonging to the primary access category to transmit to a first device during the TXOP. Retrieving data units can include retrieving an A-MPDU. In some cases, retrieving an A-MPDU can include accessing a portion of an A-MPDU to generate a data unit fragment.

At 415, the communication process determines at least one secondary access category for the TXOP. The secondary access category is an access category included in the group of access categories. The secondary access category has a transmission priority different from the primary access category. In some cases, determining a secondary access category can include selecting an access category having a transmission priority higher than the primary access category. The communication process can determine additional secondary access categories for the TXOP based on there being available communication resources to transmit data in the TXOP.

At 420, the communication process retrieves one or more secondary data units belonging to the secondary access category to transmit to a second device during the TXOP. Retrieving data units can include retrieving an A-MPDU.

At 425, the communication process transmits spatially steered streams to wireless communication devices during the TXOP. The steered streams can embody the one or more primary data units and the one or more secondary data units. During a TXOP, one or more multi-user frames can be transmitted consecutively. Transmitting the steered streams can include transmitting two or more data frames that are associated with two or more different TIDs to two or more destinations, respectively. In some implementations, the communication process selects an access category for each recipient device of a multi-user frame.

In a multi-user frame, there are two or more data frames for respective two or more different recipients. In some implementations, a data frame includes data belonging to the same access category and same recipient. The length of the multi-user frame can be determined based on the data frame having the longest length. In some implementations, the length of a multi-user frame is determined by the max-length data frame among one or more (primary access category data frames. In some implementations, any secondary access category data frames included in the multi-user frame are limited to be less than or equal to the length set by the max-length primary data frame. In some implementations, the length of the multi-user frame is determined by the max-length data frame among all primary access category and secondary access category data frame.

A TXOP holder device (e.g., a wireless device, running the process of FIG. 4) can include one or more primary data units in a multi-user frame. The device can determine a length of the multi-user frame based on the one or more primary data units. In some implementations, the device can limit a length the one or more secondary data units in the multi-user frame based on the determined length. For example, whereas a length of a multi-user frame can be adjusted to accommodate the primary data units, the length is not adjusted to accommodate the secondary data units. Secondary data units that are not selected for a multi-user frame can be selected for a following multi-user frame in a TXOP. For example, retrieving secondary data units can include retrieving an A-MPDU that is longer than the determined length of the multi-user frame. In such a case, the retrieved A-MPDU can be fragmented over two or more multi-user frames in a TXOP.

A TXOP holder device can cause recipients of a multi-user frame to send acknowledgement responses at different times. The TXOP holder device can control a recipient that receives at least a portion of the one or more primary data units to send a first acknowledgement response after an end of the multi-user frame. The TXOP holder device can control a recipient that receives at least a portion of the one or more secondary data units to send a second acknowledgement response after an end of a transmission period for the first acknowledgement response. In some implementations, the TXOP holder device can send a poll frame to control a recipient device to send an acknowledgement response.

In some implementations, TXOP holder device transmits and exhausts primary access category data before transmitting secondary access category data. For example, based on the primary access category data being ready, the TXOP holder device transmits the primary access category data before the secondary access category data. In some implementations, based on the device starting to transmit secondary access category data, the TXOP holder device does not switch back to transmitting the primary access category data later on in the same TXOP. In some implementations, based on the secondary access category data having a higher priority than the primary access category data, the TXOP holder device is allowed to switch from transmitting the primary access category to transmitting secondary access category and, after completing secondary access category data, then switch back to transmitting additional primary access category data.

In some implementations, when the TXOP holder device plans one or more multi-user transmissions in a TXOP, the TXOP holder device can start from primary data to secondary data for multi-user transmissions recipients. If primary data are available for a multi-user transmission recipient, the TXOP holder device can transmit primary data for the receiver first; and based on primary data not being available for a receiver, the TXOP holder device can schedule secondary access category data for the receiver. Based on a primary data transmission to a receiver and a subsequent second data transmission to the receiver, the TXOP holder device, in some implementations, is required to not switch back to transmitting primary data to the receiver. In some implementations, once the transmission of primary data for all receivers has been transmitted in a TXOP, the TXOP holder device ends the TXOP.

In some implementations, when the TXOP holder device plans one or more multi-user transmissions in a TXOP, the TXOP holder device can select either a primary access category or any secondary access category for a receiver as far as the TXOP holder device can ensure that one or more multi-user transmissions during the TXOP include at least one primary access category data frame. For example, the TXOP holder device can pick a primary access category for receiver A and a secondary access category for receiver B in the first transmission; and pick a secondary access category for receiver A and primary access category for receiver B in the second transmission; and pick primary access category for receiver A and another secondary access category for receiver B in the third transmission.

Figure 5:
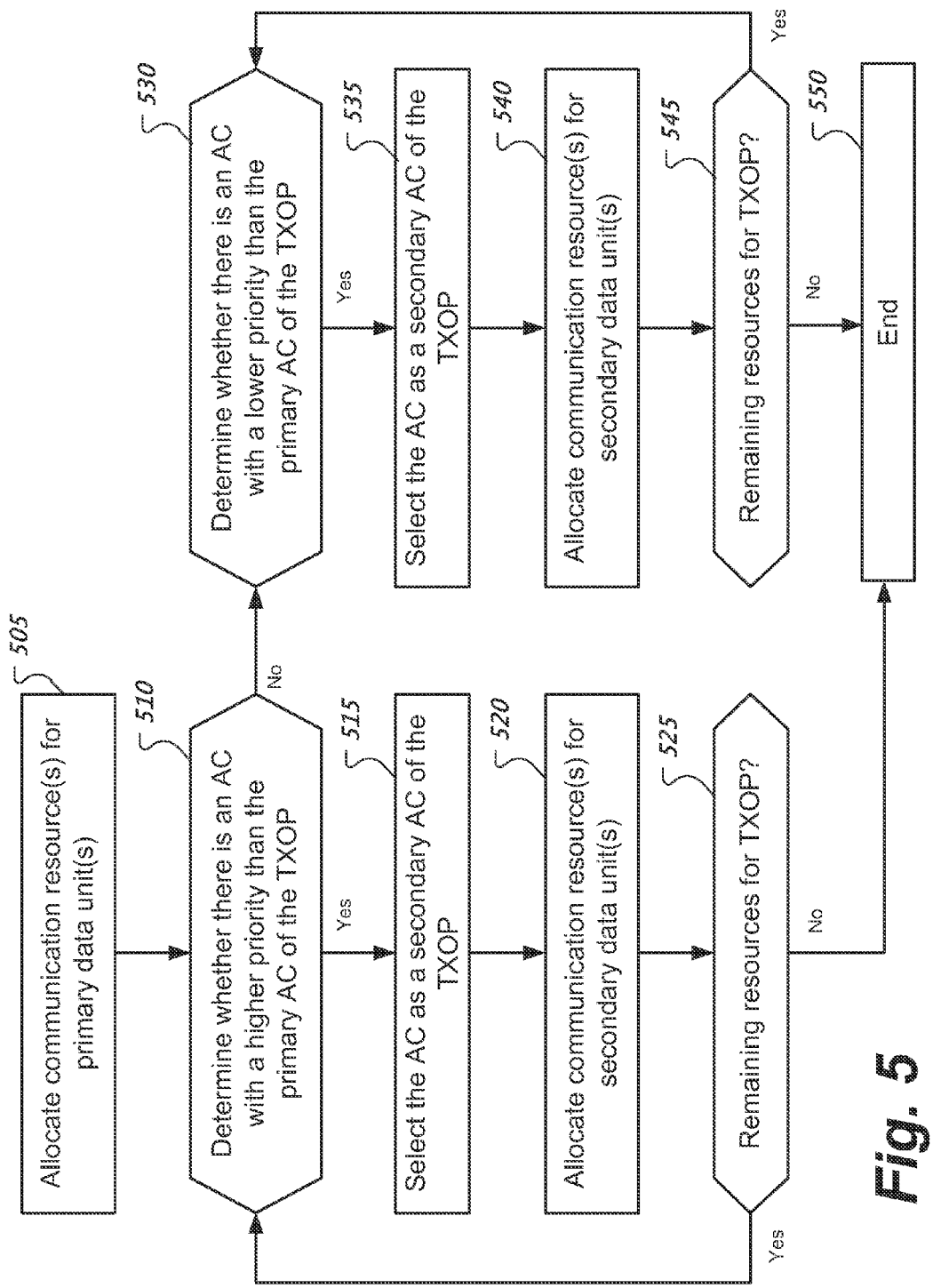
FIG. 5 shows an example of a communication process for determining one or more secondary access categories of a transmission opportunity.

FIG. 5 shows an example of a communication process for determining one or more secondary access categories of a TXOP. At 505, a communication process allocates one or more communication resources for one or more primary data units. Allocating communication resources can include scheduling a spatial wireless communication channel for a specific time period. Based on determining a primary access category and a receiver of the primary access category data and there being available communication resources, the communication process determines one or more MU receivers that can share the communication resources with the first receiver. Based on the available data in all MU receivers, the MU transmitter can determine the secondary access category data that can be piggybacked to the primary access category data.

At 510, the communication process determines whether there is an access category with a higher priority than the primary access category of the TXOP. Such determining can include identifying access categories having data for transmission. Based on there being an access category with a higher priority and data ready to send, the communication process, at 515, selects the access category as a secondary access category of the TXOP. At 520, the communication process allocates one or more communication resources for the secondary data units. Based on an allocation, the secondary data units can be removed from a corresponding access category queue. In some implementations, the secondary data units are marked as being allocated and are not available for further allocation during a TXOP. At 525, the communication process determines whether there are one or more remaining resources for the TXOP. Based on at least one remaining resource being available, the communication process repeats the determining at 510 to select one or more additional secondary access categories. If there are no more available resources, then the communication process, at 550, is finished identifying access categories for the TXOP.

Based on there being no access categories, or no more access categories, with higher priorities than the primary access category that have data for transmission, the communication process, at 530, determines whether there is an access category with a lower priority than the primary access category of the TXOP. Based on there being an access category with a lower priority, the communication process, at 535, selects the access category as a secondary access category of the TXOP. Based on there being multiple access categories with lower priority, the process can select one having higher priority. At 540, the communication process allocates one or more communication resources for one or more secondary data units. At 545, the communication process determines whether there are one or more remaining resources for the TXOP. Based on at least one remaining resource being available, the communication process repeats the determining at 530 to select additional secondary access categories. If there are no more available resources, then the communication process, at 550, is finished identifying access categories for the TXOP. In some cases, the communication process finishes identifying access categories for the TXOP based on there being no more data ready for transmission.

A communication process can determine a multi-user group (e.g., a group of recipients of a MU transmission) for a MU transmission. In some implementations, once a multi-usergroup is determined, and the primary access category is assigned to one multi-user receiver, for other receivers, access categories with available data can be treated equally. The access category picking for each receiver can be based on factors such as the overall TXOP throughput, available data priorities, and multi-user receiver priorities.

Figure 6:
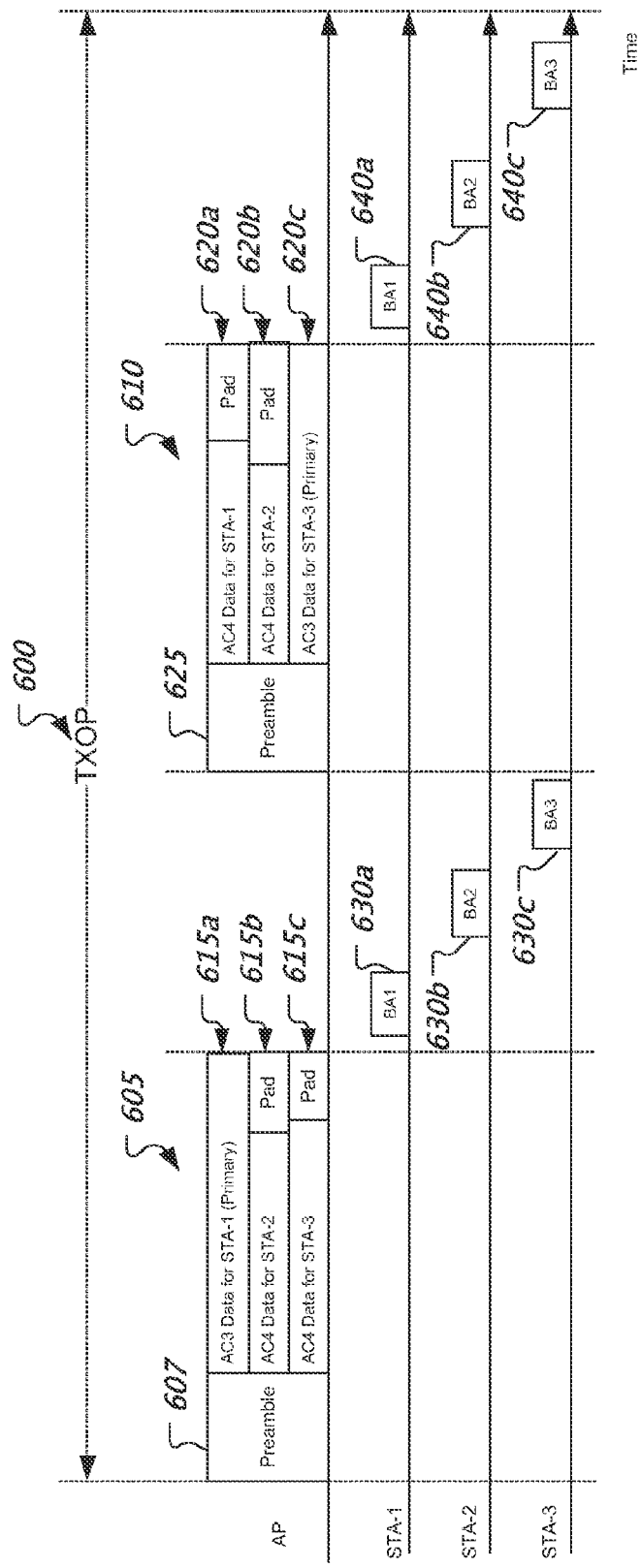
FIG. 6 shows an example of communication activities between devices during a transmission opportunity.

FIG. 6 shows an example of communication activities between multiple devices during a TXOP. An AP can transmit two or more MU frames 605, 610 during a TXOP 600. In this example, a primary access category for the TXOP 600 is "AC3" and a secondary access category for the TXOP 600 us "AC4." As depicted by FIG. 6, recipients of the MU frames 605, 610 include devices STA-1, STA-2, and STA-3.

A first MU frame 605 includes three spatially steered data frames 615a, 615b, 615c for respective devices, STA-1, STA-2, and STA-3. The MU frame 605 includes a preamble portion 607, which can include steered and unsteered preamble portions. A first data frame 615a includes a data unit from the AC3 queue for STA-1. Because the first data frame 615a includes data from the primary access category, the first data frame 615a can be referred to as a primary data frame of the MU frame 605. A second data frame 615b includes a data unit from the AC4 queue for STA-2. Because the second data frame 615b includes data from a secondary access category, the second data frame 615b can be referred to as a secondary data frame of the MU frame 605. A third data frame 615c includes a data unit from the AC4 queue for STA-3. Because the third data frame 615c includes data from a secondary access category, the third data frame 615c can be referred to as a secondary data frame of the MU frame 605. A data frame 615b, 615c can include padding. In some implementations, a data frame 615a, 615b, 615c includes a data unit such as an A-MPDU. The recipient devices can send acknowledgement responses such as block acknowledgements (BA) 630a, 630b, 630c after successffully receiving their respective data frames 615a, 615b, 615c.

A second MU frame 610 includes three spatially steered data frames 620a, 620b, 620c for respective devices, STITA-1, STA-2, and STA-3. The MU frame 610 includes a preamble portion 625, which can include steered and unsteered preamble portions. A first data frame 620a includes a data unit from the AC4 queue for STA-1. Because the first data frame 620a includes data from a secondary access category, the first data frame 620a can be referred to as a secondary data frame of the MU frame 610. A second data frame 620b includes a data unit from the AC4 queue for STA-2. Because the second data frame 620b includes data from a secondary access category, the second data frame 620b can be referred to as a secondary data frame of the MU frame 610. A third data frame 620c includes a data unit from the AC3 queue for STA-3. Because the third data frame 620c includes data from the primary access category, the third data frame 620c can be referred to as a primary data frame of the MU frame 610. The recipient devices can send acknowledgement responses such as block acknowledgements (BA) 640a, 640b, 640c after successfully receiving their respective data frames 620a, 620b, 620c.

In some implementations, the duration of a MU frame in a TXOP is determined by the longest PPDU belonging to the primary access category for the TXOP. In some implementations, the duration is not extended to accommodate a longer PPDU belonging to a secondary access category. In some implementations, a secondary access category PPDU that would extend past the end of the MU frame is fragmented into two or more frames. In some implementations, the longest primary access category PPDU is not padded (e.g., adding padding delimiters to the end of the A-MPDU, PSDU, or both) with additional symbols to accommodate a longer secondary access category PPDU. In some implementations, the longestprimary access category PPDU does not contain unnecessary zero-length delimiters (e.g., between A-MPDU subframes or at the end of the PPDU) that would extend the PPDU to have one or more extra symbols in order to accommodate a longer secondary access category PPDU. In some implementations, a transmitting device does not tower the Modulation and Coding Scheme (MCS) of the longest primary access category PPDU to extend the PPDU with extra symbols in order to accommodate a longer secondary access category PPDU. The transmitting device can decide the MCS for the primary access category PPDU(s) by concluding PPDUs within the MU frame belong to the primary access category. In some implementations, PPDUs in a MU frame (including primary and secondary access category PPDUs) are adjusted to match the length of the longest PPDU with priority greater than the primary access category. In some implementations, the MU frame length is determined by the longest PPDU in the frame, disregarding the access category of the PPDU. In other words, if the longest PPDU belong to a secondary access category, the primary access category PPDU can be extended or padded to match the length of the longest PPDU.

Based on a SDMA transmission of a MU frame, a transmitting device can receive immediate responses (e.g., acknowledgment responses) from one or more of the recipient devices associated with the SDMA transmission. One or more of the individual transmissions embodied by a SDMA transmission may be received unsuccessfully. An immediate response may indicate that a recipient did not successfully receive its individual transmission. Based on an individual transmission within a SDMA transmission failing, the corresponding EDCAF performs a medium access recovery with a longer back-off. A retransmission can be started based on the end of the recovery back-off. In some implementations, in cases where a failed individual transmission belongs to the primary AC andaccess category or TID of the TXOP, the transmitting device can perform a channel access recovery with a longer back-off before retransmission(s). The retransmissions can be performed with other new transmissions in a SDMA transmission. In cases where a failed individual transmission belongs to a AC andaccess category or TID different from the primary AC andaccess category or TID of the TXOP, the transmitting device can perform channel access recovery for EDCAFs corresponding to the failed transmissions. Such EDCAFs can be granted new SDMA transmission opportunities after the channel access recovery back-off, whereas other EDCAFs are not required to perform channel access recovery. In some implementations, only when the first response to the first transmission in a TXOP is not received, the transmitter starts a recovery back-off based on the EDCAF and ACor access category associated with the PPDU that elicits the first response. If the first response is received correctly, the transmitter can continue using the remaining TXOP to transmit data even if some of the following transmissions fail. In some implementations, the PPDU in the first transmission that elicits the first response shall belong to a primary access category. In some implementations, the PPDU in the first transmission that elicits the first response can belong to any access category associated with the TXOP, and if the first response is not received correctly, the transmitter starts recovery back-off based on the primary access category, and the secondary access categories' back-off timers are not affected.

At the beginning of a. TXOP, the back-off timers of secondary access categories can be suspended. Based on there being no transmission failures during the TXOP, a back-off timer(s) of a secondary access category(s) involved in a. MU transmission during the TXOP can resume once the medium is idle for AIFS after the TXOP. In other words, multi-access category transmissions do not affect the back-off timer(s) of a secondary access category/s). In some implementations, the contention window (CW) for a secondary access category is reset to a corresponding CWmin value, and a corresponding back-off timer is recalculated.

Based on there being a transmission failure of a. PPDU belonging to a primary access category of a TXOP, for a secondary access category involved in any MU transmission in the TXOP that does not result in a transmission failure, a corresponding back-off timer can resume once the medium is idle for AIFS. In some implementations, the contention window for a secondary access category is unchanged, and a corresponding back-off timer is recalculated. In some implementations, the contention window for a secondary access category changes based on CW_NEW=((CW_OLD+1)*2−1), and a corresponding back-off timer is recalculated. In some implementations, the contention window for a secondary access category is reset to a corresponding CWmin value, and a corresponding back-off timer is recalculated.

Based on there being a PPDU transmission failure belonging to a secondary access category of a TXOP, the back-off timer for the secondary access category can resume once the medium is idle for AIFS. In some implementations, the contention window for the secondary access category is unchanged, and a corresponding back-off timer is recalculated. In some implementations, the contention window for the secondary access category changes based on CW_NEW=((CW_OLD+1)*2−1), and a corresponding back-off timer is recalculated.

The back-off timer for a primary access category can be affected based on there being a transmission failure for a secondary access category PPDU. For such a case, in some implementations, the contention window for the primary access category is unchanged, and a corresponding back-off timer is recalculated. In some implementations, the contention window for the primary access category changes based on CW_NEW=((CW_OLD+1)*2−1), and a corresponding back-off timer is recalculated. In some implementations, the contention window for the primly access category is reset to a corresponding CWmin value, and a corresponding back-off timer is recalculated.

Based on there being a PPDU transmission failure belonging to a secondary access category of a TXOP, for other secondary access categories involved in one or more MU transmissions in the TXOP that do not result in a transmission failure, the corresponding back-off timers can resume once the medium is idle for AIFS. In some implementations, the contention windows for these other secondary access categories are unchanged, and the corresponding back-off timers are recalculated. In some implementations, the contention windows for these other secondary access categories change based on CW_NEW=((CW_OLD+1)*2−1), and corresponding back-off timers are recalculated. In some implementations, the contention windows for these other secondary access categories are reset to a corresponding CWmin value, and corresponding back-off timers are recalculated.

With respect to the following figures, transmission signals can include one or more legacy training fields (L-TFs) such as a Legacy Short Training Field (L-STF) or Legacy Long Training Field (L-LTF). Transmission signals can include one or more Legacy Signal Fields (L-SIGs). Transmission signals can include one or more VHT Signal Fields (VHT-SIGs). Transmission signals can include one or more VHT training fields (VHT-TFs). Examples of such training fields include a VHT Short Training Field (VHT-STF) and a VHT Long Training Field (VHT-LTF). Transmission signals can include different types of data fields such as VHT-Data fields.

A VHT device can use a protection mechanism to secure a wireless communication medium for one or more multi-user transmissions during a TXOP. A VHT protection mechanism can include transmitting a control frame such as a RTS/CTS or CTS-to-Self prior to a VHT transmission. Such control frames can be included in a sequence that sets a network allocation vector (NAV) on devices monitoring the wireless communication medium. Another VHT protection mechanism can include transmitting initial non-HT based PPDU that requires a response frame. For example, devices can exchange transmissions based on a sounding request and feedback sequence. Yet another VHT protection mechanism can include transmitting a VHT based PPDU that requires a response using a non-HT PPDU, such as a legacy formatted PPDU. The required response can be, for example, an acknowledgement response (e.g., BA).

Figure 7:
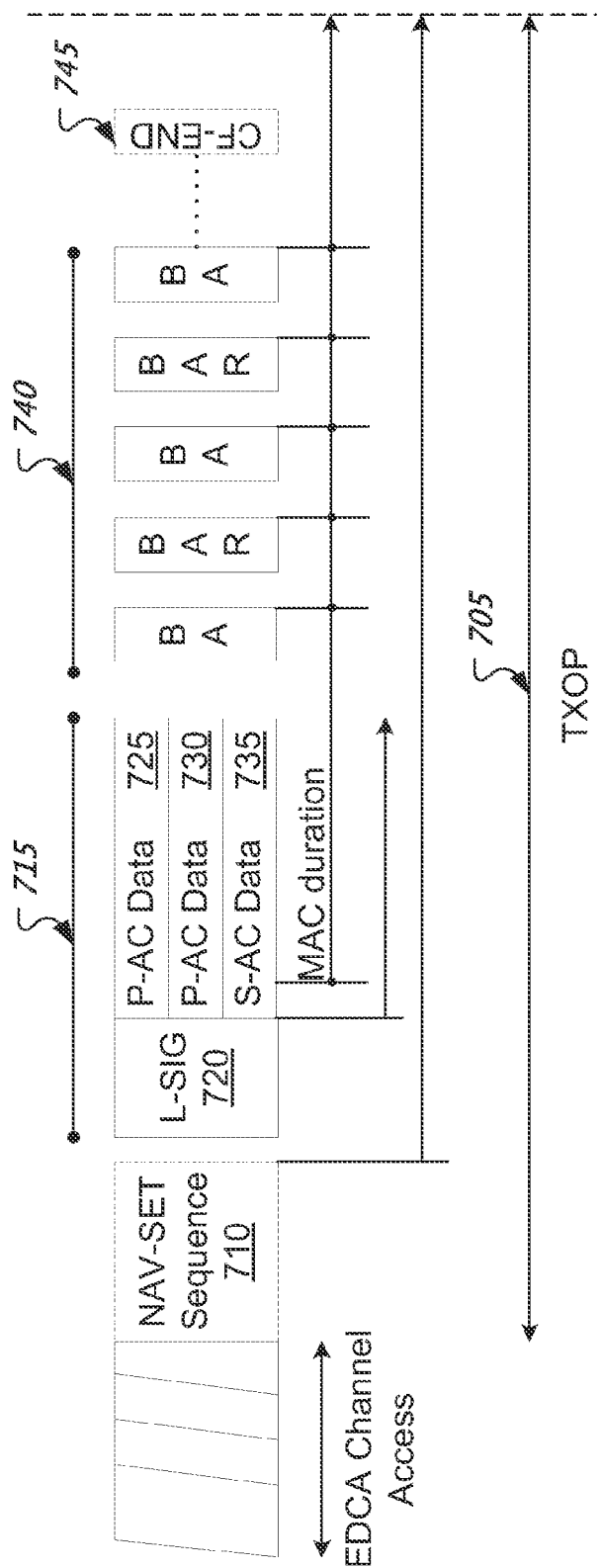
FIG. 7 shows an example of wireless communication exchanges during an Enhanced Distributed Channel Access based transmission opportunity.

FIG. 7 shows an example of wireless communication exchanges during an EDCA based TXOP. A TXOP 705 is obtained using EDCA parameters associated with a primary AC (P-AC) of the TXOP 705. A NAV-SET sequence 710 can be used to protect the TXOP 705 from transmissions by unrelated devices. Various examples of a NAV-SET sequence 710 include a sounding sequence, RTS/CTS exchange sequence, or CTS-to-Self.

Based on completion of the NAV-SET sequence 710, a device can transmit a multi-user transmission such as a MU frame 715. The MU frame 715 include a data frame 725 that contains data from a P-AC for a first device, a data frame 730 that contains data from the P-AC for a second device, and a data frame 735 that contains data from a secondary AC (S-AC) for a third device. Other data content and access categories are possible.

A L-SIG 720 of the MU frame 715 can protect till the end of the MU frame 715. Each of the data frames 725, 730, 735 of the MU frame 715 includes a MAC duration field that is decodable by the intended recipient of a respective data frame. A MAC duration in frames (e.g., non-HT BA and BAR frames that are based on a legacy format) transmitted during an acknowledgement period 740 following the transmission of the MU frame 715 can provide protection till the end of the TXOP 705 from unrelated devices including unrelated VHT devices, HT devices, and legacy devices. A TXOP holder can terminate the TXOP 705 by transmitting a CF-END frame 745.

Figure 8:
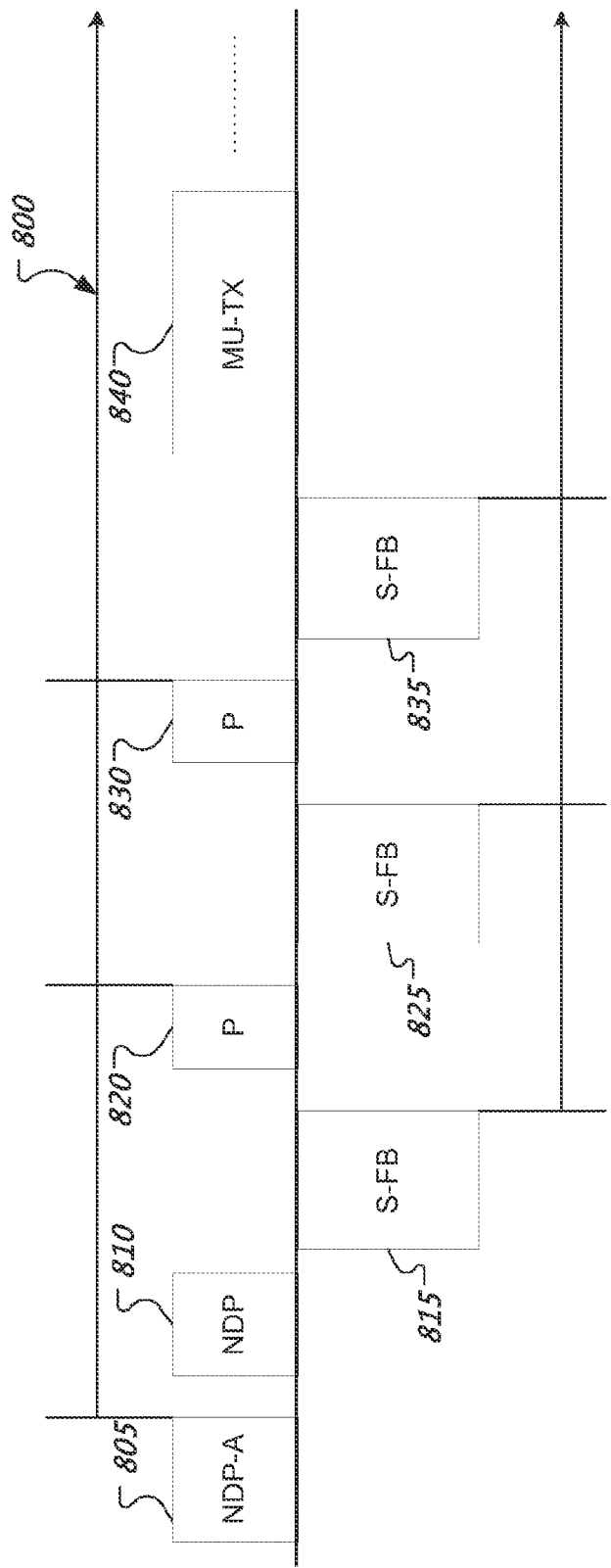
FIG. 8 shows an example of using a sounding sequence to set a network allocation vector to protect a transmission opportunity.

FIG. 8 shows an example of using a sounding sequence to set a network allocation vector to protect a TXOP. A device can use a sounding sequence to set a NAV for a TXOP 800. A sounding sequence includes a null data packet announcement (NDP-A) frame 805, a null data packet (NDP) frame 810, polling frames 820, 830, and sounding feedback (S-FB) frames 815, 825, 835. After the sounding sequence, the device performs a MU transmission 840. The NDP-A frame 805 can be used to establish the TXOP 800. A NDP-A frame 805 can be transmitted based on a non-HT duplicate mode. In some implementations, the NDP-A frame 805 is not transmitted based on a non-HT duplicate mode, and the first sounding feedback is transmitted by using a non-HT based PPMU, or a poll frame can be transmitted by using a non-HT based PPMU, or both.

The bandwidth of the TXOP 800 can be greater than or equal to the bandwidth indicated by the NDP-A frame 805. The bandwidth indicated by the NDP-A frame 805 can be greater than or equal to the bandwidth indicated by the following NDP frame 810. The bandwidth indicated by the NDP frame 810 can be greater than or equal to the bandwidth indicated by the following polling frames 820, 830. In some implementations, the bandwidth indicated by the NDP frame 810 is the same as the bandwidth indicated by the NDP-A frame 815. In some implementation, the indicated bandwidths of the NDP-A frame 805, the NDP frame 810, and the polling frames 820, 830 are required to be the same in the same TXOP 800. Frames such as NDP-A frame 805, NDP frame 810, and the polling frames 820, 830 can include a bandwidth configuration field such as a bandwidth information field in a PHY preamble, service field, a MAC header, MAC payload, or a PHY pad.

The bandwidth indicated by the first sounding feedback 815 can be the same as the bandwidth indicated by the NDP-A frame 805 and the NDP frame 810. In some cases, the bandwidth indicated by the first sounding feedback 815 can be less than the bandwidth indicated by the NDP-A frame 805 and the NDP frame 810. The bandwidth indicated by the second sounding feedback 825 can be the same as the bandwidth indicated by the first polling frame 820. In some cases, the second sounding feedback 825 bandwidth is can be less than the bandwidth indicated by the first polling frame 820. The bandwidth indicated by the third sounding feedback 835 can be the same as the bandwidth indicated by the second polling frame 830. A sounding feedback 815, 825, 835 can include a bandwidth (BW) information field in a PHY preamble, Service field, a MAC header, MAC payload, or a PHY pad.

The NDP-A frame 805 and polling frames 820, 830 can inherit the primary access category associated with one or more of the data frames in the MU transmission 840. Frames such as NDP-A frame 805 and NDP frame 810 can be addressed to a device receiving data from the primary access category of the TXOP 800 during the MU transmission 840. In some cases, a polling frame 820, 830 can be addressed to other devices receiving data from the primary access category during the MU transmission 840. In some cases, a polling frame 820, 830 can be addressed to a device receiving data from a secondary access category during the MU transmission 840.

A MU transmission, in some implementations, can serve to set a NAV. Based on the initial frame of a TXOP being a MU-PPDU, a primary device (e.g., a device receiving data from a primary access category) can transmit an immediate acknowledgement response based on a short interframe space (SIFS) duration after receiving the MU-PPDU. For example, a potential sequence includes {MU-PPDU+acknowledgement response+poll+acknowledgement response}. In another example, a potential sequence includes {MU-PPDU+poll+acknowledgement response+poll+acknowledgement response}. Based on the initial frame of a TXOP being a CTS-to-Self followed by a MU-PPDU, the MU-PPDU can cause an immediate acknowledgement response from a primary device. For example, a potential sequence includes {CTS-to-Self+MU-PPDU+acknowledgement response+poll+acknowledgement response}. In another example, a potential sequence includes {CTS-to-Self+MU-PPDU+poll+acknowledgement response+poll+acknowledgement response}.

A group identifier (GID) assignment frame, sent as an initial frame of a TXOP, can serve to set a NAV. A GID assignment frame can inherit the primary user priority (UP) of the data frame(s) or the primary AC of the management frame(s) that are included in a MU transmission. A GID assignment frame can include a BW information field in a PHY preamble, Service field, a MAC header, MAC payload, or a PHY pad.

Figure 9:
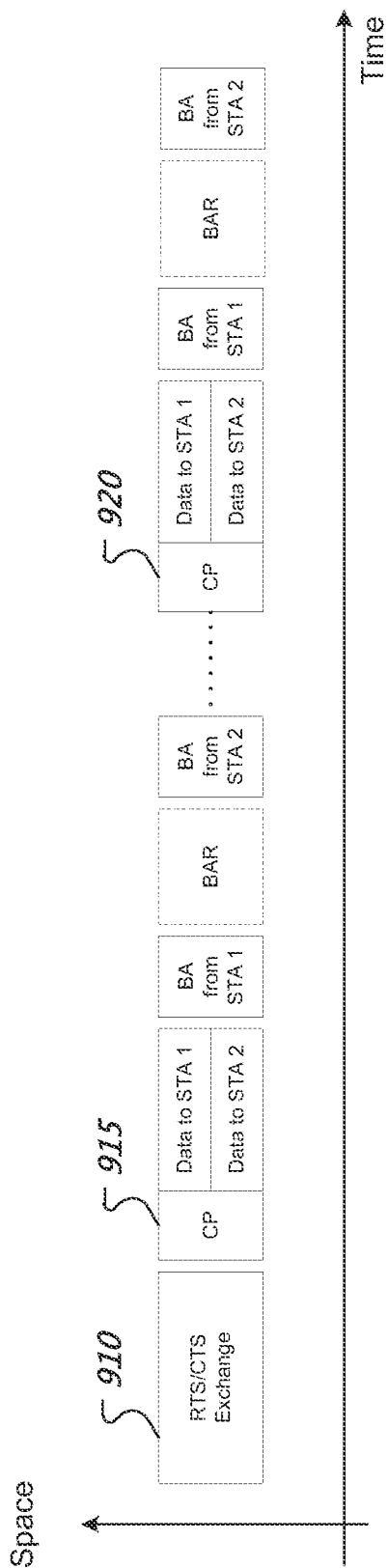
FIG. 9 shows an example of using a RTS/CTS exchange sequence to set a network allocation vector.

FIG. 9 shows an example of using a RTS/CTS exchange sequence to set a network allocation vector. RTS/CTS exchange 910 can include sending RTS frames to two or more devices and receiving corresponding CTS frames from the respective devices. A RTS/CTS exchange 910 can be used to secure a wireless medium based on setting a NAV. In some cases, a RTS/CTS exchange 910 can protect a single sequence, including a data frame and associated responses, in a TXOP. In some cases, a RTS/CTS exchange 910 can protect an entire TXOP.

In a multi-user frame, a common preamble (CP) 915 can include a L-SIG and a VHT-SIG-A that protect at least a portion of the TXOP. The L-SIG is in an unsteered portion of the frame, which can be decoded by multiple different types of devices (e.g., VHT devices and legacy devices). A PPDU duration, included in the CP 915, can be used to protect a single frame (e.g., a transmitted PPDU). A transmission sequence duration, included in the CP 915, can be used to protect a single frame or a single sequence. Devices that are not addressed by the transmission sequence can sleep till the end of the transmission sequence duration. A CP 915 can include the address information (e.g., a partial address identifier, MU group identifier, or group index) of one or more destined devices. A receiving device can use the address information to determine whether it is a recipient of the MU frame.

In some implementations, PPDU duration is included in the CP 915. In some implementations, a PPDU duration and a TX sequence duration are included in the CP 915. In some implementations, a PPDU duration and a MAC duration are included in the CP 915. A MAC duration can be used to protect a single sequence or a remaining portion of the TXOP. A PPDU duration for a specific recipient device can be located in a steered preamble. Devices can set or reset a NAV based on one or more duration fields (e.g., PPDU duration, TX sequence duration, or a MAC duration). An additional CP 920 include in an additional MU frame transmitted latter during the TXOP can be used to extend the NAV.

A device can send one or more control frames (e.g., a legacy based RTS or a Mil based RTS (MU-RTS)) to attempt to secure a wireless medium for one or more MU transmissions. A MU-RTS frame can include the addresses of all MU receivers during a TXOP and can indicate a CTS response sequence, CTS response schedule, or both. A MU-RTS frame can include steered frames for separate recipients. A device can send a MU-RTS frame to cause recipient devices to send respective CTS frames. A MU-RTS can include two or more durations, such as a duration in a MAC header and a duration in a MAC payload. A first MU-RTS duration can indicate the end of a period for sending a CTS. VHT devices can reset their NAVs based on a lack of receiving a CTS and a lack of transmissions during a SIFS duration after receiving the last CTS of an RTS/CTS exchange. A second MU-RTS duration can indicate the end of the TXOP. VHT devices can set their NAVs to the end of the TXOP based on detecting a transmission after receiving the last CTS of an RTS/CTS exchange. A CTS duration cover to the end of the TXOP or a TX sequence. In some implementations, a device can send a CTS-to-Self with first duration information and send a MU-RTS with second duration information. In some implementations, a MU-RTS can be a modified version of a legacy RTS such that legacy devices can process at least a portion of the MU-RTS.

In some implementations, wireless devices can exchange the following sequence {RTS+CTS+RTS+CTS+RTS+CTS} to secure wireless medium for transmitting one or more MU frames. Devices receiving a RTS can reset a NAV based on the received RTS based on there being a lack of transmissions for a duration after receiving the last RTS. Devices that set their NAV according to previously received control frames (e.g., RTS, CTS) can respond to a CTS to a newly received RTS from the same TXOP holder. After the initial RTS/CTS pair exchange of the sequence, one or more additional RTS/CTS pair exchanges can be started a duration after the previous data exchange, which allows the receiver to check the channel busy/idle status during this duration. The duration can be based on an interframe space (IFS) parameter, such as a point coordination function IFS (PIFS) duration value. Based on receiving a RTS during a beginning portion of a TXOP, a RTS receiver can check available bandwidth (e.g., check whether channels have been idled for a sufficient duration before the RTS) and send a CTS based on the available bandwidth at the RTS receiver side. In some implementations, based on receiving a RTS after a beginning portion of a TXOP, a receiving device can send a CTS using the same bandwidth as indicated in the RTS bandwidth field.

Based on receiving a MU-RTS, recipient devices can transmit CTS frames via SDMA. For example, CTS from multiple devices can be sent at the same time to the TXOP holder. In some implementations, a recipient of a RTS can use the same scrambler seed as used by the received RTS to send a CTS. In some implementations, a MU-RTS can cause a primary device to transmit a CTS frame before other devices transmits CTS frames.

A TXOP holder can obtain a TXOP for two or more frequency channels using a multi-channel (MC) EDCA access rule and performing a multi-channel RTS/CTS exchange. A MC EDCA access rule can include monitoring for an AIFS plus back-off duration in a principle channel and for a PIFS duration in one or more secondary channels. A multi-channel RTS/CTS exchange includes sending one or more multi-channel RTS frames and receiving one or more multi-channel CTS frames to determine a TXOP bandwidth. Based on obtaining a TXOP and a determining a TXOP bandwidth, a TXOP holder device transmits one or more frames in accordance with the TXOP bandwidth. Determining a TXOP bandwidth can include selecting the smallest bandwidth that is indicated by one or more received multi-channel CTS frames.

Response frames can use the same or less bandwidth than indicated by a previously received frame. In some implementations, frames such as an acknowledgement response frame, a CF-END frame, or a sounding feedback frame can be sent in a single frequency channel if one or more channels associated with a bandwidth indicated by a previously received frame is not clear (e.g., busy). In some implementations, after initial frame exchange (e.g., initial multi-channel RTS/CTS exchange), the TXOP holder and the responder(s) record the usage bandwidth for the TXOP and do not send subsequent frames and response frames exceeding the TXOP bandwidth. In this case, a responder not knowing a previous frame's BW can send a frame with a BW different from previous frame's BW as far as the BW is smaller than the TXOP BW.

Figure 10:
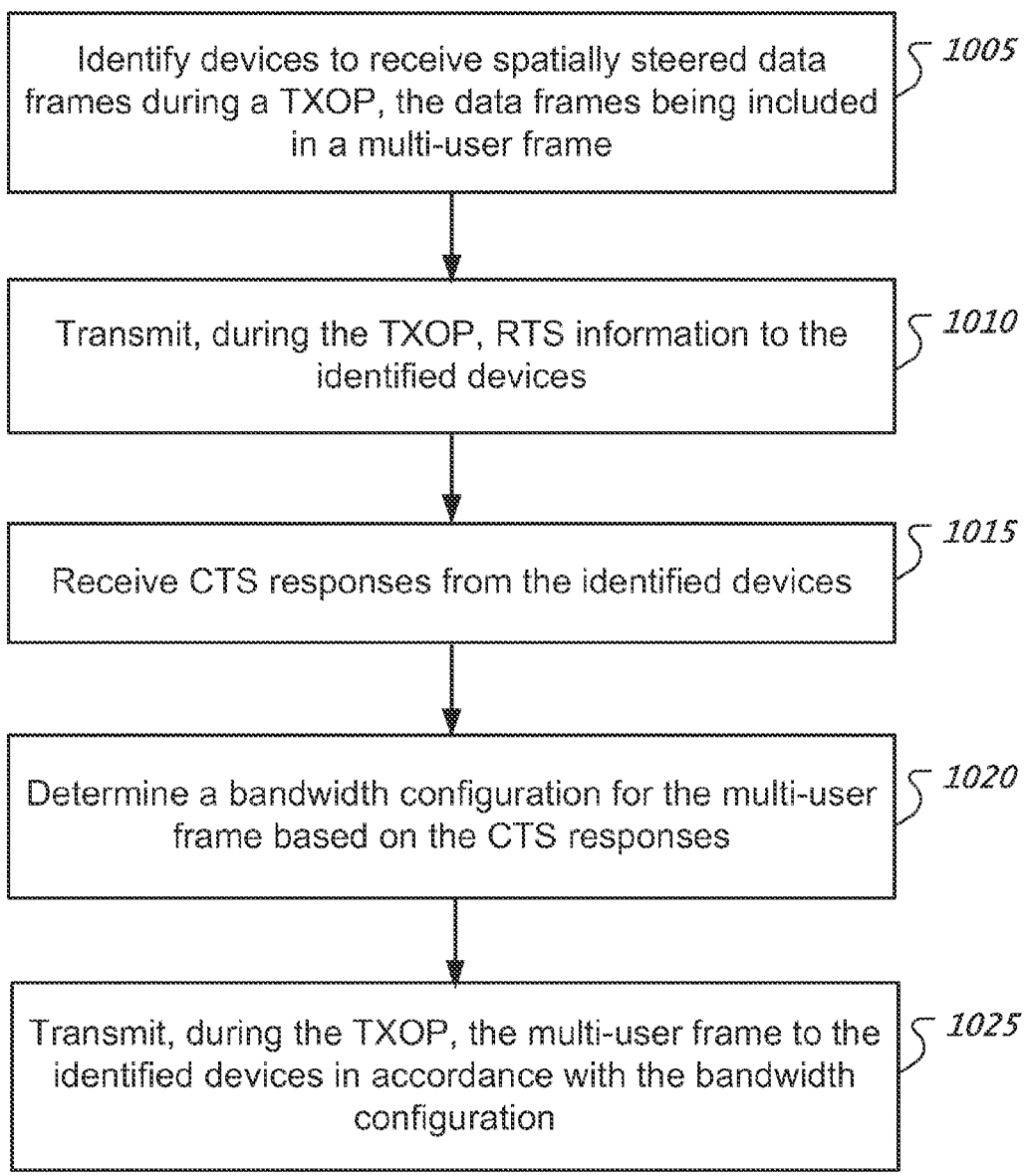
FIG. 10 shows an example of a communication process based on a RTS/CTS exchange sequence for a multi-user transmission.

FIG. 10 shows an example of a communication process based on a RTS/CTS exchange sequence for a multi-user transmission. A RTS/CTS exchange sequence can protect the neighborhood of the device performing the multi-user transmission and the neighborhoods of the intended recipients by causing unrelated devices to suspend transmissions during the transmission opportunity. At 1005, the communication process includes identifying devices to receive spatially steered data frames during a TXOP, the data frames being included in a multi-user frame. In some implementations, the communication process can obtain a TXOP based on monitoring one or more primary channels and one or more secondary channels for wireless traffic. For example, based on a primary channel being idled for an AIFS duration plus a back-off duration, and one or more secondary channels being idle for at least a PIFS duration, the device can use the idle channels to transmit an initial frame of the TXOP such as an initial RTS frame.

At 1010, the communication process includes transmitting, during the TXOP, RTS information to the identified devices. Transmitting RTS information can include transmitting one or more RTS frames. Transmitting RTS information can include transmitting a multi-user RTS frame to cause the identified devices to transmit the CTS responses. In response to receiving the RTS information (e.g., receiving a RTS frame), an identified device can transmit a CTS response such as a CTS frame.

At 1015, the communication process includes receiving CTS responses from the identified devices. Receiving CTS responses can include receiving CTS frames via one or more channels. A CTS response can include an indication of one or more frequency bands available for transmission. In some implementations, receiving CTS responses can include receiving, during a response period associated with a RTS frame such as a multi-user RTS frame, CTS frames via respective spatial wireless communication channels.

At 1020, the communication process includes determining a bandwidth configuration for the multi-user frame based on the CTS responses. The bandwidth configuration can indicate one or more frequency bands that are available during at least a portion of the TXOP. Control frames such as RTS frames and CTS frames can include a bandwidth configuration, such as multi-channel bandwidth configuration, can indicate a requested or available bandwidth (e.g., 20, 40, 80, or 160 MHz). In some implementations, a bandwidth configuration indicates one or more 20 MHz frequency bands, e.g., frequency channels. Other bandwidths for a frequency band are possible. Two or more frequency bands can be aggregated to provide greater communication bandwidths. Based on a multi-channel bandwidth configuration, transmitting a RTS frame can include transmitting two or more legacy compatible RTS frames on respective two or more 20 MHz channels. Transmitting a CTS frame can include transmitting a legacy compatible CTS frame on one or more channels that are available for a transmission.

At 1025, the communication process includes transmitting, during the TXOP, the multi-user frame to the identified devices in accordance with the bandwidth configuration. Transmitting a multi-user frame can include transmitting, concurrently, spatially steered data frames to two or more wireless communication devices. Transmitting a multi-user frame can include using one or more frequency bands.

The communication process, in some implementations, can generate a multi-user frame that includes data belonging to a primary access category of the TXOP and data belonging to a secondary access category of the TXOP. Identifying devices to receive spatially steered data frames during a TXOP can include identifying a primary device of the devices that will receive data belonging to the primary access category. Transmitting RTS information can include transmitting an initial RTS frame to the identified primary device.

In some implementations, transmitting RTS information can include transmitting a first RTS frame to a first device of the identified devices. Receiving CTS responses can include receiving, after transmitting the first RTS frame, a first CTS frame. Transmitting the RTS information can include transmitting, based on receiving the first CTS frame, a second RTS frame to a second device of the identified devices. Receiving the CTS responses can include receiving, after transmitting the second RTS frame, a second CTS frame.

In some implementations, a bandwidth configuration indicated by the first CTS frame is equal to or less than a bandwidth configuration indicated by the first RTS frame. In some implementations, a bandwidth configuration indicated by the second CTS frame is equal to or less than a bandwidth configuration indicated by the second RTS frame. For example, based on a RTS recipient device's determination that there is less available bandwidth than the bandwidth indicated by the received RTS, the recipient device can send a CTS with a bandwidth indication that is less than that of the received RTS. Determining the bandwidth configuration for the multi-user frame can include selecting a smallest bandwidth configuration indicated by the CTS responses. The communication process can select the bandwidth configuration indicated by the second RTS frame to be less than or equal to the bandwidth configuration indicated by the first CTS frame.

Transmitting the second RTS frame can be responsive to an expiration of a timer. In some implementations, a timer can be configured based on receiving the first CTS frame and a PIFS duration parameter. The second device can be configured to determine an availability of two or more channels during a duration of the timer. In some implementations, the second RTS can be transmitted based on a duration after the first CTS frame. In some implementations, additional RTS frames can be transmitted in the middle of a TXOP based on a PIFS duration after a previous data exchange. In some implementations, a timer can be configured based on receiving the first CTS frame and a SIPS duration parameter. The second CTS frame can indicate the same bandwidth configuration as indicated by the second RTS frame.

Figure 11:
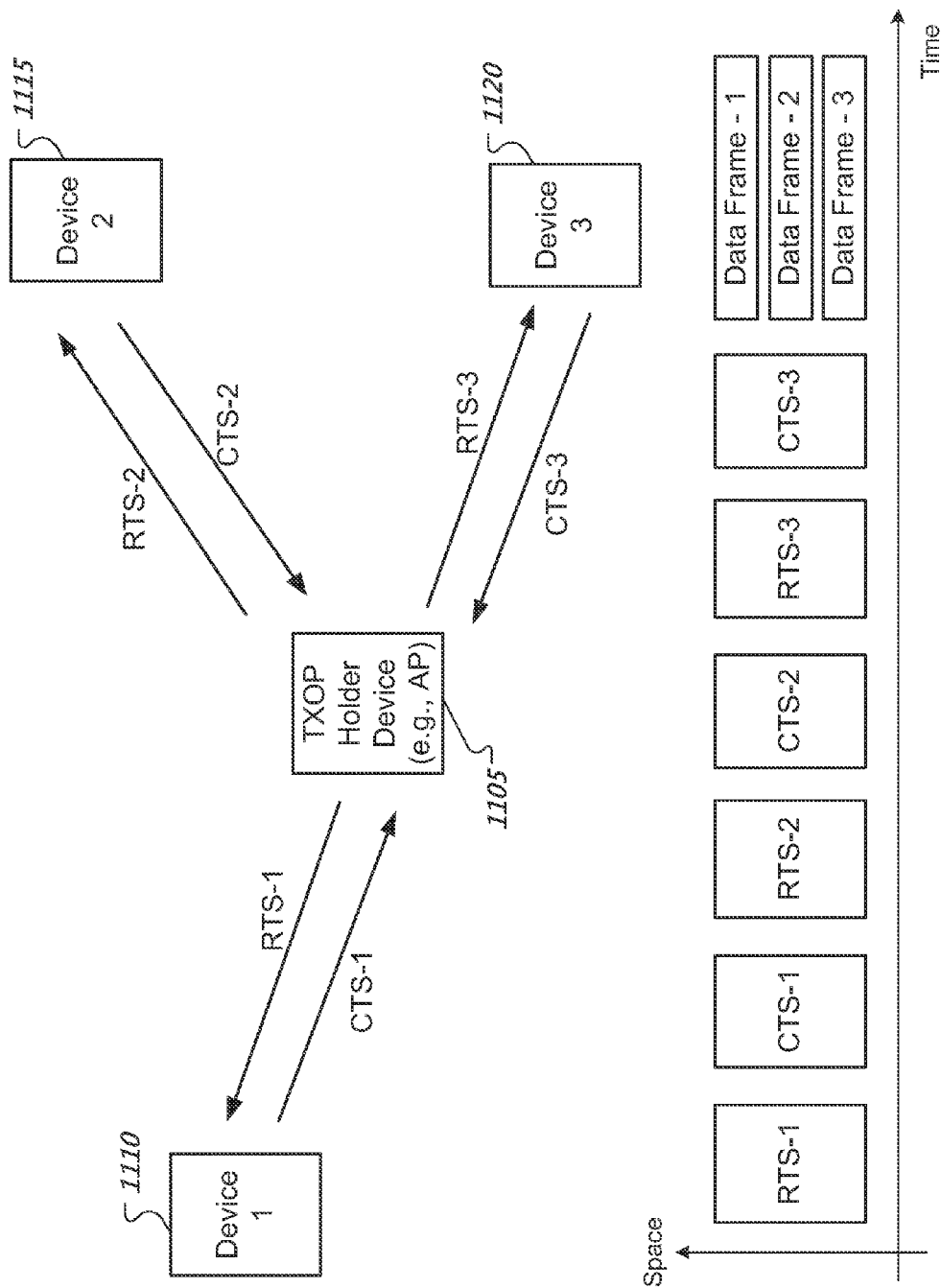
FIG. 11 shows an example of a RTS/CTS exchange sequence for a multi-user transmission.

FIG. 11 shows an example of a RTS/CTS exchange sequence for a multi-user transmission. A TXOP holder device, such as an AP 1105, can be a wireless communication device that has obtained a TXOP based on one or more channel access procedures (e.g., EDCA). Based on obtaining a TXOP, the AP 1105 sends a first RTS to a first device 1110, which replies with a first CTS. Based on receiving the first CTS, the AP 1105 sends a second RTS to a second device 1115, which replies with a second CTS. Based on receiving the second CTS, the AP 1105 sends a third RTS to a third device 1120, which replies with a third CTS. Based on receiving the third CTS, or last CTS in the case of an additional device(s), the AP 1105 performs a MU transmission, which includes concurrently transmitting steered a data frame to the first device 1110, a steered data frame to the second device 1115, and a steered data to the third device 1120. Extensions to one or more additional devices are possible.

In some implementations, the bandwidth indicated by a CTS is equal to or smaller than the bandwidth indicated by the RTS that elicits the CIS. In some implementations, the bandwidth indicated by a CTS is based on a valid bandwidth configuration of one or more frequency bands. The valid bandwidth configuration can indicate widths of 20 MHz, 40 MHz, 80 MHz, or 160 MHz.

The bandwidth probing of the second device 1115 and the third device 1120 can be separate from the bandwidth probing of the first device 1110. In some implementations, the bandwidth indicated by the first, second, and third RTSs are required to be less than or equal to the bandwidth accessible by the TXOP holder device, e.g., AP 1105. In some implementations, subsequent single user (SU) transmissions to the first device 1110 are limited to be less than or equal to the bandwidth of the first CTS; subsequent SU transmissions to the second device 1115 are limited to be less than or equal to the bandwidth of the second CTS; and subsequent SU transmissions to the third device 1120 are limited to be less than or equal to the bandwidth of the third CTS. Subsequent MU transmissions to the first device 1110, second device 1115, and third device 1120 are limited to be less than or equal to the smallest bandwidth indicated by the first, second, and third CTSs. Extensions to one or more additional devices are possible.

The bandwidth probing of the second device 1115 can be dependent on the bandwidth probing of the first device 1110. Further, the bandwidth probing of the third device 1120 can be dependent on the bandwidth probing of the second device 1115. In some implementations, the bandwidth of the second RTS shall not exceed the bandwidth of the first CTS, and the BW of the third RTS shall not exceed the bandwidth of the second CTS. For example, the bandwidth probing of the second device 1115 can be limited by the bandwidth probing result of the first device 1110. The bandwidth probing of the third device 1120 can be limited by the BW probing result of the second device 1115. In some implementations, subsequent transmissions (e.g., SU transmissions or MU transmissions) after the third CTS are limited to be less than or equal to the BW indicated by the third CTS. Extensions to one or more additional devices are possible.

The TXOP holder device, e.g., AP 1105, in some implementations, can schedule the second RTS to be transmitted based on a PIFS duration after a previous transmission or frame exchange, so that the second device 1115 has sufficient time to check whether the secondary channels are idle for receiving subsequent transmissions. In some implementations, AP 1105 can schedule the second RTS to be transmitted based on a SIFS duration after the previous transmission or frame exchange. In this case, the second device 1115 may not have sufficient time to decide whether the secondary channels are idle enough, and can send a CTS using the same bandwidth that is indicated by a received RTS. Note that SIFS is less than PITS and that SIFS is the typical gap between frame transmissions in a TXOP.

In some implementations, a TXOP holder can perform an additional RTS/CTS exchange(s) during a TXOP. For example, a TXOP holder can send a multi-channel RTS after the first MU transmission of data frames and their respective acknowledgements. In some implementations, the holder sends a multi-channel RTS based on a PIFS duration after the previous data exchange.

In some implementations, after an initial multi-channel RTS during a TXOP, a TXOP holder can send subsequent multi-channel RTSs based on a SIFS duration after a previously received multi-channel CTS frame. Based on the initial multi-channel RTS indicating a bandwidth configuration associated with two or more channels, a recipient device can check channels indicated by the initial multi-channel RTS to determine whether a channel is available some implementations, the recipient device performs a PIFS idle channel check on one or more secondary channels associated with the multi-channel RTS. In some implementations, the initial multi-channel RTS can include identifiers (e.g., addresses) of two or more devices to receive separate RTS frames in the same TXOP. Devices identified by a multi-channel RTS can check available bandwidth. For one or more subsequently received RTS frames, a recipient device can transmit a CIS with an indicated BW that is based on the bandwidth indicated by the received RTS and the device's determined available bandwidth. In some implementations, a RTS recipient device checks whether the channel(s) indicated by a received RTS have been idled for a sufficient time (e.g., PIFS) before receiving the RTS. Based on received a RTS, a bandwidth indicated by a CTS BW is based on one or more channels that are sufficiently idle before receiving the RTS.

A recipient device can record a source radio address associated with the sender of an initial RTS of a TXOP as the TXOP holder. The recorded source radio address can be used to determine whether a response is required for a subsequently received RTS. If an additional RTS is received from the TXOP holder in the same TXOP, the recipient can respond with a CTS.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A program does not necessarily correspond to a file in a file system. A program can be stored in a portion of a file that holds other programs or data one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

White this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method, comprising:
performing, at a first device, a protection sequence with multiple second devices to protect a wireless communication neighborhood of the first device and wireless communication neighborhoods of the second devices for a transmission of a multi-user frame, the multi-user frame comprising spatially steered data frames that are respectively intended for the second devices;
determining bandwidth availabilities for the second devices based on information received from the second devices during the protection sequence;
selecting a bandwidth configuration for the multi-user frame based on the bandwidth availabilities to produce a selected bandwidth configuration that enables the data frames to be spatially steered and transmitted concurrently within the multi-user frame based on a common bandwidth availability among the second devices; and
generating and transmitting the multi-user frame to the second devices in accordance with the selected bandwidth configuration.

2. The method of claim 1, wherein selecting the bandwidth configuration comprises determining one or more frequency bands that are available among the second devices.

3. The method of claim 1, wherein performing the protection sequence comprises:
transmitting a request to send (RTS) to the second devices; and
receiving clear to send (CTS) responses from the second devices.

4. The method of claim 3, wherein the CTS responses comprise an indication of availability of one or more frequency bands.

5. The method of claim 3, wherein:
transmitting the RTS comprises transmitting a first RTS frame to a first one of the second devices,
receiving the CTS responses comprises receiving, after transmitting the first RTS frame, a first CTS frame,
transmitting the RTS comprises transmitting, based on receiving the first CTS frame, a second RTS frame to a second one of the second devices, and
receiving the CTS responses comprises receiving, after transmitting the second RTS frame, a second CTS frame.

6. The method of claim 5, wherein determining the bandwidth availabilities comprises determining a first bandwidth configuration for the first one of the second devices based on the first CTS frame, and determining a second bandwidth configuration for the second one of the second devices based on the second CTS frame,
wherein the first bandwidth configuration indicated by the first CTS frame is equal to or less than a bandwidth configuration indicated by the first RTS frame, the first bandwidth configuration being based on an available bandwidth at the first one of the second devices,
wherein the second bandwidth configuration indicated by the second CTS frame is equal to or less than a bandwidth configuration indicated by the second RTS frame, the second bandwidth configuration being based on an available bandwidth at the second one of the second devices, and
wherein selecting the bandwidth configuration for the multi-user frame comprises selecting a smallest bandwidth configuration indicated by the CTS responses.

7. The method of claim 3, wherein transmitting the RTS comprises transmitting a multi-user RTS (MU-RTS) frame to cause the second devices to transmit the CTS responses.

8. The method of claim 7, wherein receiving the CTS responses comprises receiving, during a response period associated with the MU-RTS frame, CTS frames via respective spatial wireless communication channels.

9. An apparatus, comprising:
circuitry configured to perform a protection sequence with multiple devices to protect a wireless communication neighborhood of the apparatus and wireless communication neighborhoods of the devices for a transmission of a multi-user frame, the multi-user frame comprising spatially steered data frames that are respectively intended for the devices;
circuitry configured to determine bandwidth availabilities for the devices based on information received from the devices during the protection sequence;
circuitry configured to select a bandwidth configuration for the multi-user frame based on the bandwidth availabilities to produce a selected bandwidth configuration that enables the data frames to be spatially steered and transmitted concurrently within the multi-user frame based on a common bandwidth availability among the devices; and
circuitry configured to generate and control a transmission of the multi-user frame to the devices in accordance with the selected bandwidth configuration.

10. The apparatus of claim 9, wherein the circuitry configured to select the bandwidth configuration comprises circuitry configured to determine one or more frequency bands that are available among the devices.

11. The apparatus of claim 9, wherein the circuitry configured to perform the protection sequence is configured to perform operations comprising:
transmitting a request to send (RTS) to the devices; and
receiving clear to send (CTS) responses from the devices.

12. The apparatus of claim 11, wherein the CTS responses comprise an indication of availability of one or more frequency bands.

13. The apparatus of claim 11, wherein:
transmitting the RTS comprises transmitting a first RTS frame to a first device of the devices,
receiving the CTS responses comprises receiving, after transmitting the first RTS frame, a first CTS frame,
transmitting the RTS comprises transmitting, based on receiving the first CTS frame, a second RTS frame to a second device of the devices, and
receiving the CTS responses comprises receiving, after transmitting the second RTS frame, a second CTS frame.

14. The apparatus of claim 13, wherein the circuitry configured to determine the bandwidth availabilities comprises circuitry configured to determine a first bandwidth configuration for the first device based on the first CTS frame, and determining a second bandwidth configuration for the second device based on the second CTS frame,
wherein the first bandwidth configuration indicated by the first CTS frame is equal to or less than a bandwidth configuration indicated by the first RTS frame, the first bandwidth configuration being based on an available bandwidth at the first device,
wherein the second bandwidth configuration indicated by the second CTS frame is equal to or less than a bandwidth configuration indicated by the second RTS frame, the second bandwidth configuration being based on an available bandwidth at the second device, and wherein the selected bandwidth configuration is based on a smallest bandwidth configuration indicated by the CTS responses.

15. The apparatus of claim 11, wherein transmitting the RTS comprises transmitting a multi-user RTS (MU-RTS) frame to cause the devices to transmit the CTS responses.

16. The apparatus of claim 15, wherein receiving the CTS responses comprises receiving, during a response period associated with the MU-RTS frame, CTS frames via respective spatial wireless communication channels.

17. A system comprising:
circuitry, included in a first device, to access a wireless communication interface; and processor electronics, included in the first device, configured to perform operations comprising:
performing a protection sequence with multiple second devices to protect a wireless communication neighborhood of the first device and wireless communication neighborhoods of the second devices for a transmission of a multi-user frame, the multi-user frame comprising spatially steered data frames that are respectively intended for the second devices;
determining bandwidth availabilities for the second devices based on information received from the second devices during the protection sequence;
selecting a bandwidth configuration for the multi-user frame based on the bandwidth availabilities to produce a selected bandwidth configuration that enables the data frames to be spatially steered and transmitted concurrently within the multi-user frame based on a common bandwidth availability among the second devices;
generating the multi-user frame to the second devices in accordance with the selected bandwidth configuration; and
controlling a transmission of the multi-user frame via the wireless communication interface.

18. The system of claim 17, wherein selecting the bandwidth configuration comprises determining one or more frequency bands that are available among the second devices.

19. The system of claim 17, wherein performing the protection sequence comprises:
transmitting a request to send (RTS) to the second devices; and
receiving clear to send (CTS) responses from the second devices.

20. The system of claim 19, wherein the CTS responses comprise an indication of availability of one or more frequency bands.

21. The system of claim 19, wherein:
transmitting the RTS comprises transmitting a first RTS frame to a first one of the second devices,
receiving the CTS responses comprises receiving, after transmitting the first RTS frame, a first CTS frame,
transmitting the RTS comprises transmitting, based on receiving the first CTS frame, a second RTS frame to a second one of the second devices, and
receiving the CTS responses comprises receiving, after transmitting the second RTS frame, a second CTS frame.

22. The system of claim 21, wherein determining the bandwidth availabilities comprises determining a first bandwidth configuration for the first one of the second devices based on the first CTS frame, and determining a second bandwidth configuration for the second one of the second devices based on the second CTS frame,
wherein the first bandwidth configuration indicated by the first CTS frame is equal to or less than a bandwidth configuration indicated by the first RTS frame, the first bandwidth configuration being based on an available bandwidth at the first one of the second devices,
wherein the second bandwidth configuration indicated by the second CTS frame is equal to or less than a bandwidth configuration indicated by the second RTS frame, the second bandwidth configuration being based on an available bandwidth at the second one of the second devices, and
wherein selecting the bandwidth configuration for the multi-user frame comprises selecting a smallest bandwidth configuration indicated by the CTS responses.

23. The system of claim 19, wherein transmitting the RTS comprises transmitting a multi-user RTS (MU-RTS) frame to cause the second devices to transmit the CTS responses.

24. The system of claim 23, wherein receiving the CTS responses comprises receiving, during a response period associated with the MU-RTS frame, CTS frames via respective spatial wireless communication channels.

* * * * *